(12) United States Patent
Takeda et al.

(10) Patent No.: US 6,808,467 B2
(45) Date of Patent: Oct. 26, 2004

(54) BLADE TENSIONER AND SYSTEM FOR A CHAIN

(75) Inventors: Hiroyuki Takeda, Nabari (JP); Shinji Tsuruta, Nabari (JP); Hiroyoshi Mitsuhashi, Nabari (JP); Sadao Kojima, Wako (JP); Akira Terao, Wako (JP); Kensuke Nakamura, Wako (JP); Hajime Maeda, Wako (JP); Masashi Yamada, Wako (JP)

(73) Assignee: Borgwarner Inc., Auburn Hills, MI (US)

( * ) Notice: Subject to any disclaimer, the term of this patent is extended or adjusted under 35 U.S.C. 154(b) by 69 days.

(21) Appl. No.: 10/147,710

(22) Filed: May 17, 2002

(65) Prior Publication Data

US 2002/0198073 A1 Dec. 26, 2002

(51) Int. Cl.[7] ............................................. F16H 7/08
(52) U.S. Cl. ...................................... 474/111; 474/140
(58) Field of Search ................................ 474/111, 140, 474/101, 135

(56) References Cited

U.S. PATENT DOCUMENTS

| | | | | |
|---|---|---|---|---|
| 4,662,862 A | * | 5/1987 | Matson | 474/101 |
| 4,826,468 A | * | 5/1989 | Friedrichs | 474/101 |
| 5,148,983 A | * | 9/1992 | Muniz | 239/56 |
| 5,266,066 A | * | 11/1993 | White | 474/111 |
| 5,779,582 A | * | 7/1998 | Mott et al. | 474/140 |
| 5,846,150 A | * | 12/1998 | Wigsten | 474/140 |
| 5,984,815 A | * | 11/1999 | Baddaria | 474/111 |
| 6,312,353 B1 | * | 11/2001 | Oba | 474/140 |
| 6,524,202 B1 | * | 2/2003 | Tada et al. | 474/140 |
| 2002/0107097 A1 | * | 8/2002 | Takeda | 474/111 |

FOREIGN PATENT DOCUMENTS

| | | | | |
|---|---|---|---|---|
| DE | 4310306 A1 | * | 10/1994 | ............ F16H/7/08 |
| DE | 19747 163 A1 | | 4/1998 | ............ F16H/7/06 |
| EP | 1030 079 A2 | | 8/2000 | ............ F16H/7/08 |
| JP | 2000-230611 | | 8/2000 | |
| JP | 2000-234656 | | 8/2000 | |
| JP | 2001-32895 | | 2/2001 | |

* cited by examiner

*Primary Examiner*—David A. Bucci
*Assistant Examiner*—Bradley J. Van Pelt
(74) *Attorney, Agent, or Firm*—Brown & Michaels, PC; Greg Dziegielewski

(57) ABSTRACT

A blade tensioner of a blade tensioner system for a chain that drivingly connects a drive shaft to a driving shaft in an engine, that improves the chain-damping efficiency in a blade tensioner applied to the chain within an engine, prevents the sideways tilt of the blade tensioner during operation, in a blade tensioner applied to the chain in an engine, and provides a blade tensioner with a functionality that allows it to transversely guide a chain along the chain sliding face in a blade shoe, while maintaining the flexural deformability (i.e., the flexibility) of the blade shoe.

17 Claims, 25 Drawing Sheets

(a)

(b)

$\alpha < \alpha'$

BLADE TENSIONER AND SYSTEM FOR A CHAIN

BACKGROUND OF THE INVENTION

1. Field of the Invention

The invention pertains to the field of blade tensioning. More particularly, the invention pertains to an improvement of the structure of a blade tensioner and a system that includes a blade tensioner that applies tension to the chain that drivingly connects the driven shaft within an engine to the driving shaft.

2. Description of Related Art

A blade tensioner has been used conventionally as the tensioner that applies tension to a chain. Generally, a blade tensioner consists principally of a resinous blade shoe having an arcuately curved chain sliding face, and metallic leaf spring-shaped blade springs that are disposed on the side opposite the chain sliding face of the blade shoe and that are used to exert a spring force on the blade shoe.

During chain operation, the chain travels while sliding along the chain sliding face of the blade shoe. At this time, the chain is subjected to compression loading as a result of the elastic resilience of the blade springs and the blade shoe, thereby tensioning the chain. When the chain slackens during operation, the blade springs, which deform elastically on the side where the radius of curvature increases, are subjected to return deformation on the side where the radius of curvature decreases, thereby causing the blade shoe to protrude into the chain side and take up the chain slack, so a constant, uniform tension is maintained in the chain.

There are numerous problems that arise involving how well the blade tensioner works. One such problem is damping efficiency. In an automobile engine, a blade tensioner as disclosed in prior art Japanese Patent Application Public Disclosure No. 2000-234656, and shown in FIG. 1, the blade tensioner (100) consists principally of the resinous blade shoe (101) having the arcuately curved chain sliding face (101a), the metallic leaf spring-shaped blade springs (102) that are disposed on the side opposite the chain sliding face (101a) of the blade shoe (101) and that are used to exert a spring force on the blade shoe (101), and the metallic support blade (103) that supports the blade shoe (101). Slots (110a) and (111a) are formed in the distal end portion (110) and the proximal end portion (111), respectively, of the blade shoe (101), and the ends of the blade springs (102) are inserted into and held within these slots. A pair of holes (103a)(103b), is formed in the support blade (103), and the support blade (103) is fastened within the engine by means of bolts inserted through these holes. The proximal end portion (111) of the blade shoe (101) is supported rotatably by the pin (104) fastened in the support plate (103). The lock washer (105) is installed on the pin (104). Support portion (130), which is equipped with the support face (130a) that slidably support the distal end portion (110) of the blade shoe (101), is provided at the end of the support plate (103).

As shown in prior art FIG. 2, the blade spring (102) has a radius of curvature $r_o$ smaller than the radius of curvature of the blade shoe (101). However, after the blade spring is mounted in the blade shoe (101), and the blade tensioner is installed in the engine, the radius of curvature of the blade spring (102) changes from $r_o$ to $R_o$ ($>r_o$). That is, the blade spring (102) is elastically deformed, which applies compression loading to the chain as a result of the elastic resilience equivalent to the amount of its elastic deformation, thereby maintaining the tension of the chain.

After the chain elongates during operation, the blade springs (102), which deformed elastically on the side where the radius of curvature increases in order to apply compression loading to the chain, are subjected to return deformation on the side where the radius of curvature decreases, as the result of the restoring force. Consequently, the chain sliding face (101a) of the blade shoe (101) protrudes into the chain side, thereby taking up the chain slack.

Prior art FIG. 3 shows an example of the application of the aforementioned blade tensioner to a timing chain used to drive an engine's overhead camshaft. In an engine's timing chain, the chain span generally is long because the center-to-center distance between the crankshaft and camshaft is long. As a result, the overall length of the blade shoe (101) also is long. Plus, the proximal end portion (111) of the blade shoe (101) is provided so as to rotate freely around point O, the center of the support shaft (150) fastened to the engine side. The distal end portion (110) is provided so as to slide freely along the linear support face (160) disposed on the engine side. Before the timing chain elongates, the distal end portion (110) of the blade shoe (101) contacts point A on the support face (160). When the timing chain elongates, the restoring force of the blade springs causes the blade shoe (101) to deform so that it protrudes toward the chain span side. As a result, as shown by the dashed line in FIG. 2, the proximal end portion (111) of the blade shoe (101) rotates around point O, and the distal end portion (110) slides along the support face (160), so the contact point on the support face (160) moves to point B.

At points D and E on the support face (160), the compression forces exerted by the chain on the blade shoe (101) as reactions to the compression loads applied by the blade shoe (101) to the chain are, respectively, F and F'. As for the, at point E the blade springs elastically deform as a result of the restoring force. This decreases the amount of elastic deformation, thereby also decreasing the compression load of the blade springs on the chain and results in the following inequality:

$$F > F' \qquad (1)$$

Furthermore, as shown in prior art FIG. 4, at point D, the compression force F of the chain produces the bending moment M (=F×OA) that rotates the blade shoe around point O. Similarly, at point E, the compression force F' produces the bending moment M' (=F'×OB) that rotates the blade shoe around point O.

At points D and E, the compression forces F, F' are decomposed into the direction parallel to the support face (160) and the direction orthogonal to the support face (160), and the angles formed by the directions in which the compression forces F, F' are exerted and the directions orthogonal to the support face are labeled θ and θ', respectively.

Of the compression force F at point D, F cos θ, the component orthogonal to the support face, is in equilibrium with the normal force N of the support face (160). Plus, the compression force F, F sin θ, the component parallel to the support face, is exerted in the direction that the blade shoe is slid along the support face (160). However, the force exerted against this F sin θ is the frictional force μN (i.e., μFcos θ, where μ is the coefficient of friction).

Similarly, of the compression force F' at point E, F' cos θ', the component orthogonal to the support face, is in equilibrium with the normal force N' of the support face (160). Also, of the compression force F', F' sin θ', the component parallel to the support face, is exerted in the direction that the blade shoe is slid along the support face (160). The force exerted against this F' sin θ' is the frictional force μN' (i.e., μF' cos θ').

Here θ'>θ, so $$\cos θ' < \cos θ$$

Also, from (1), $$F' < F$$

so $$μF' \cos θ' < μF \cos θ$$

Therefore, $$μN' < μN \quad (2)$$

From (2), it is evident that the frictional force is less at point E than at point D.

However, when tension fluctuation and chain rattling during operation induce chord or harmonic vibration in the blade tensioner, each blade spring in the blade shoe is subjected to repeated elastic deformation and return deformation. At this time, a damping force is generated by the sliding together of each blade spring. Also, recent research has revealed that the sliding resistance between the blade shoe's distal end portion and the support face also contributes to the blade tensioner's ability to dampen (i.e., control) the chain's chord or harmonic vibration.

Furthermore, when the chain is elongated in a conventional blade tensioner, the frictional force exerted between the support face and the distal end portion of the blade tensioner decreases considerably, which results in a problem; the damping efficiency of the blade tensioner drops.

Another problem associated with blade tensioners is the tilting of the blade tensioner in a sideways direction during operation. An example of the application of a blade tensioner as viewed from the chain sliding face side of the blade shoe to the timing chain that drives an engine's overhead camshaft is shown in prior art FIG. 5. The blade shoe (50) and the chain (60) travels along the chain sliding face (50*a*) of the blade shoe (50), through-hole (51*a*), which is formed in the base (51) of the blade shoe (50), and the shoulder bolt (70) inserted into the through-hole 51*a*. The shoulder bolt (70) is screwed into the screw hole formed in the cylinder block (71) of the engine.

According to this configuration, the blade shoe (50) rotates freely around the shoulder bolt (70) in proportion to the elongation of the chain (60). The elastic resilience of the blade springs (not shown) varies, thereby changing the amount of displacement of the blade shoe (50) toward the chain (60), which applies the appropriate tension to the chain (60).

However, in order for the blade shoe (50) to rotate around the shoulder bolt (70), a constant clearance must be provided between the through-hole (51*a*) of the blade shoe (50) that supports the shoulder bolt (70) and the head exterior surface (70*a*) of the shoulder bolt (70).

Furthermore, the creation of such a clearance sometimes causes the blade shoe 50 to tilt sideways, as shown in prior art FIG. 6, because of the lateral, left and right in prior art FIG. 5, deflection of the chain during operation. In the case of a blade tensioner applied to a timing chain, the center-to-center distance between the driving shaft and the driven shaft generally is longer than in the case of a chain used to drive auxiliary equipment (e.g., an oil pump). So, the chain span is long, so the overall length of the blade shoe of the blade tensioner also becomes long. As a result, when the blade shoe tilts sideways, the deflection of the distal end of the blade shoe also increases, so the deflection r of the distal end reaches as much as approximately 3 mm.

Also, as shown in prior art FIG. 7, an enlargement of area IX in prior art FIG. 6, such tilting of the blade shoe causes edge (51*b*) to interfere with the head exterior surface (70*a*) of the shoulder bolt (70), sometimes causing the blade shoe (50) to lock with the shoulder bolt (70) in this state. The blade shoe (50) is then unable to rotate freely around the shoulder bolt (70). As a result, the blade shoe (50) is unable to displace toward the chain by exactly the appropriate amount in response to chain elongation, so it loses the ability to maintain the appropriate tension in the chain. The interference between the edge (51*b*) of the blade shoe (50) and the shoulder bolt (70) produces wear at edge (51*b*). This further enlarges the clearance between the shoulder bolt (70) and the through-hole (51*a*) of the blade shoe (50). As a result, the blade shoe (50) tilts farther sideways.

A third problem common to blade tensioners is regarding the rigidity of the blade shoe that can result from guide portions being associated with the chain. Chains used in applications with long center-to-center distances, such as the timing chain used to drive an engine's overhead camshaft, the chain's slack-side span lengthens, so the chain's transverse deflection during operation increases. As a result, it sometimes is necessary to transversely guide the chain along the chain sliding surface.

In a hydraulic tensioner used in such applications, as shown in the cross-sectional view in prior art FIG. 8, guide portions (51)(52), that extend longitudinally along the shoe (i.e., in the direction perpendicular to the page on which the figure appears) are formed on the left and right sides of the chain sliding surface (50*a*) of the tensioner shoe (50). These guide portions (51)(52) control the transverse deflection of the chain (60), thereby guiding the travel of the chain 60. In the case of a blade tensioner the provision of guide portions (51)(52) increases the blade shoe's flexural rigidity, thereby resulting in a defect: The blade shoe (50) becomes difficult to bend.

In order to apply the appropriate constant pressure to the chain associated with the blade tensioner, it generally is necessary for the blade shoe to bend readily so that the blade shoe's radius of curvature can be varied according to the chain slackness. However, when such guide portions as guide portions (51)(52) are provided over the entire length of a blade shoe, it becomes difficult to bend the blade shoe, so the blade shoe's radius of curvature cannot be varied as appropriate to the chain slackness. As a result, the appropriate constant tension cannot be applied to the chain.

SUMMARY OF THE INVENTION

The present invention improves the chain-damping efficiency in a blade tensioner applied to the chain within an engine, prevents the sideways tilt of the blade tensioner during operation, in a blade tensioner applied to the chain in an engine, and provides a blade tensioner with a functionality that allows it to transversely guide a chain along the chain sliding face in a blade shoe, while maintaining the flexural deformability (i.e., the flexibility) of the blade shoe. The blade tensioner of the present invention is part of a blade tensioner system for a chain that drivingly connects a driven shaft in an engine to a driving shaft of the engine with a blade shoe having a shoe proper that has an arcuately curved chain sliding face and left and right pair of guide portions on both sides of the chain sliding face that are used to guide the chain sliding along the chain sliding face in a transverse direction, where the guide portions extend continuously along the chain length of the sliding face. Plus, the guide portions have a height, a plate thickness, and a cross-sectional shape that inhibits an increase in flexural rigidity of the blade shoe. In addition, the blade shoe has a proximal end portion provided at the proximal side of the shoe proper so that the proximal end portion of the blade shoe can rotate freely around a support shaft inserted therethrough, and a distal end portion provided at the distal end of the shoe proper; so that the distal end portion of the blade shoe can rotate around the support shaft inserted therethrough, and is able to slide freely along the support face provided in the engine. Lastly, the blade shoe has leaf spring-shaped blade springs that are disposed on a side opposite the chain sliding face of the blade shoe that are used to exert a spring force on the blade shoe.

BRIEF DESCRIPTION OF THE DRAWING

FIG. 19 shows the first example of the change of shape in FIG. 18a.

FIG. 21 shows a side view of the chain sliding face side of the blade tensioner of FIG. 20, showing the second example of the change of shape in FIG. 18a.

DETAILED DESCRIPTION OF THE INVENTION

The present invention is a blade tensioner system for a chain, that includes a blade tensioner used to apply tension to the chain that drivingly connects the driven shaft within an engine to the driving shaft. The blade tensioner is equipped with a blade shoe and leaf spring-shaped blade springs that are disposed on the side opposite the chain sliding face of the blade shoe and that are used to exert a spring force on the blade shoe. The blade shoe is composed of the shoe proper having an arcuately curved chain sliding face, a proximal end portion provided at the proximal end of the shoe proper, and a distal end portion provided at the distal end of the shoe proper. The proximal end portion of the blade shoe is provided so as to rotate freely around the support shaft that passes therethrough, and the distal end portion of the blade shoe is provided so as to slide freely along the support surface provided within the engine.

Figure 9:
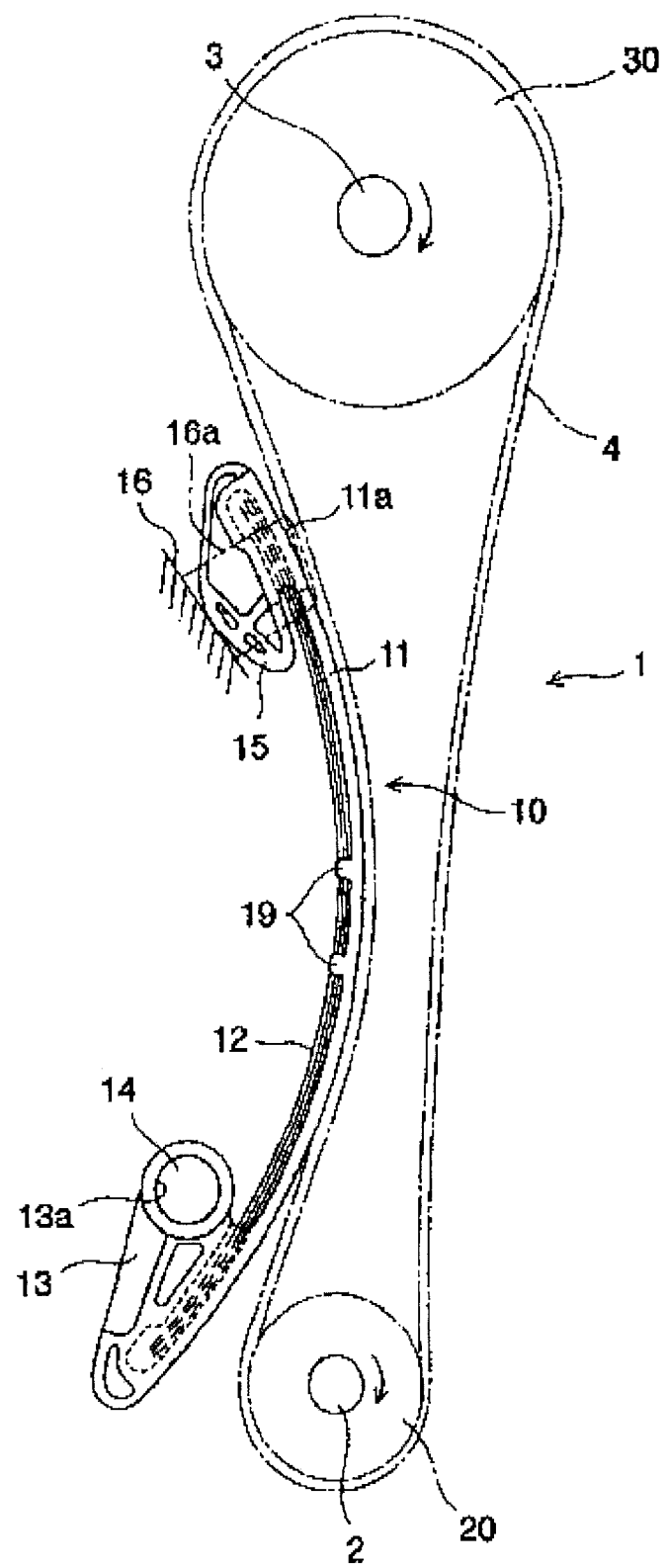
FIG. 9 shows a schematic cross-sectional view of the engine camshaft timing system that includes a blade tensioner of the present invention in the pre-elongation state.

As shown in FIG. 9, the camshaft timing system (1) is equipped with a crank sprocket (20) seated in the crankshaft (2), a cam sprocket (30) seated in the camshaft (3), and a timing chain (4) that is wrapped around the crank and cam sprockets (20) (30), which transmits the driving force of the crankshaft (2) to the camshaft (3). The arrows present in the FIGURE indicate the respective rotational directions of the crankshaft (2) and the camshaft (3).

The blade tensioner (10) is disposed on the slack-slide span of the timing chain (4) and consists principally of an arcuately curved resinous blade shoe (11) and multiple leaf spring-shaped blade springs (12), that are laminarly disposed on the side opposite the chain sliding face (11a) of the blade shoe (11), used to exert a spring force on the blade shoe (11). Plus, support tabs (10) that transversely support the blade springs, are also provided on the sides opposite the chain sliding face (11a) of the blade shoe (11) as seen in FIG. 18b.

The pivot support hole or through-hole (13a) is formed at the proximal end portion (13) of the blade shoe (11), and the shoulder bolt or support shaft (14) is inserted through the pivot support hole (13a). The shoulder bolt (14) is screwed into the screw hole formed in the engine's cylinder block (5) and a constant clearance is provided between the pivot support hole (13a) of the blade shoe (11) and the head exterior surface (14a) of the shoulder bolt (14). This allows the blade shoe (11) to rotate freely around the shoulder bolt (14). The distal end portion (15) of the blade shoe (11) contacts the support face (16) provided within the engine and is able to slide across the support face (16).

Figure 10:
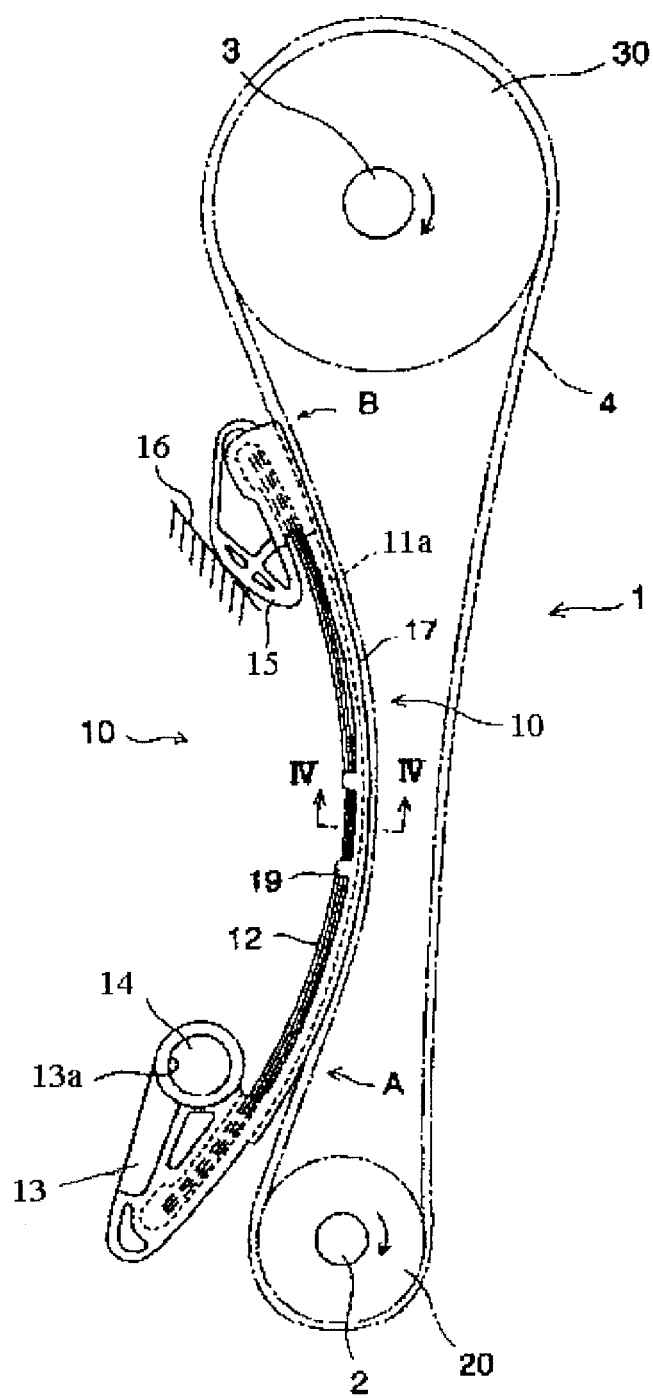
FIG. 10 shows a schematic cross-sectional view of the engine camshaft timing system that contains a blade tensioner according to the present invention.

As shown in FIG. 10, guide portions (17) extend longitudinally along the shoe, from contact start location A, at which the chain (4) leaves the crank sprocket (20) and enters the blade tensioner (10), and in this position, starts to contact the chain sliding face (11a) of the blade shoe (11) or from a location before it (i.e. at the bottom of the figure). As a result, when the chain (4) enters the blade tensioner (10) its travel is guided reliably by guide portions (17). Therefore, the chain (4) smoothly enters the chain sliding face (11a) of the blade shoe (11). The guide portions (17) extend to the separation start location B, at which the chain (4), which leaves the blade tensioner (10) and enters the cam sprocket (30), starts to separate from the chain sliding face (11a) of the blade shoe (11) or from a location after it (i.e. at the top of the figure). So, when the chain (4) leaves the blade tensioner (10), its travel is guided reliably by the guide portions (17). As a result, the chain (4) smoothly meshes with the teeth of the cam sprocket (30). Support tabs (10) transversely support the blade spring (12) are also provided on the sides opposite the chain sliding face (11a) of the blade shoe (11) as seen in FIG. 18b. The guide portions (17) are formed at approximately the center of the length of the chain sliding face (11a). This approximately central location is the location at which the deflection of the chain (4) is controlled reliably by disposing the guide portions (17) at the appropriate locations.

Figure 11:
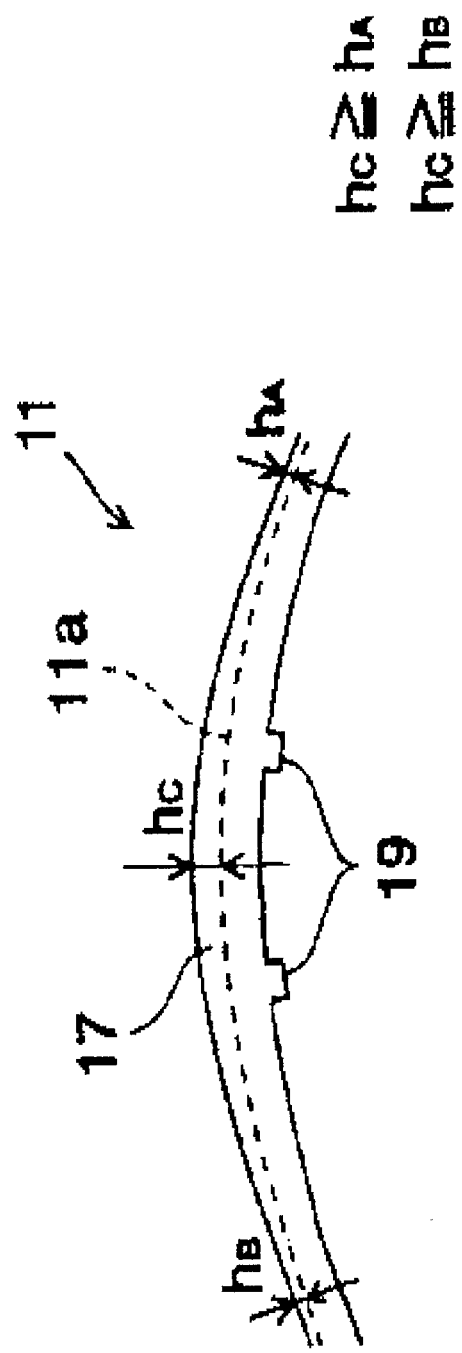
FIG. 11 shows a schematic cross-sectional view of the engine camshaft timing system that includes a blade tensioner of the present invention, showing the timing chain in the post-elongation state.

The heights of the guide portions (17) may be adjusted such that the following relationships hold:

$$h_C \geq h_A \text{ and } h_C \geq h_B \quad (3)$$

where the height of the guide portions (17) at approximately the central longitudinal location of the chain sliding face (11a) is $h_C$, and the height of the guide portions (17) at the contact start locations A and separation start location B are $h_A$ and $h_B$ respectively as seen in FIG. 11. (The dimensions in the direction orthogonal to the shoe's longitudinal directions are exaggerated.) In this case, in the chains' slack-side span, the maximum heights of the guide portions (17) are in the central part of the slack-side span, where the chain's deflection is maximum, or the heights of the guide portions (17) in the central part of the slack-side span are at least comparable to the heights at the contact start location A and separation location B, so the transverse deflections of the chain can be controlled more reliably.

Figure 8:
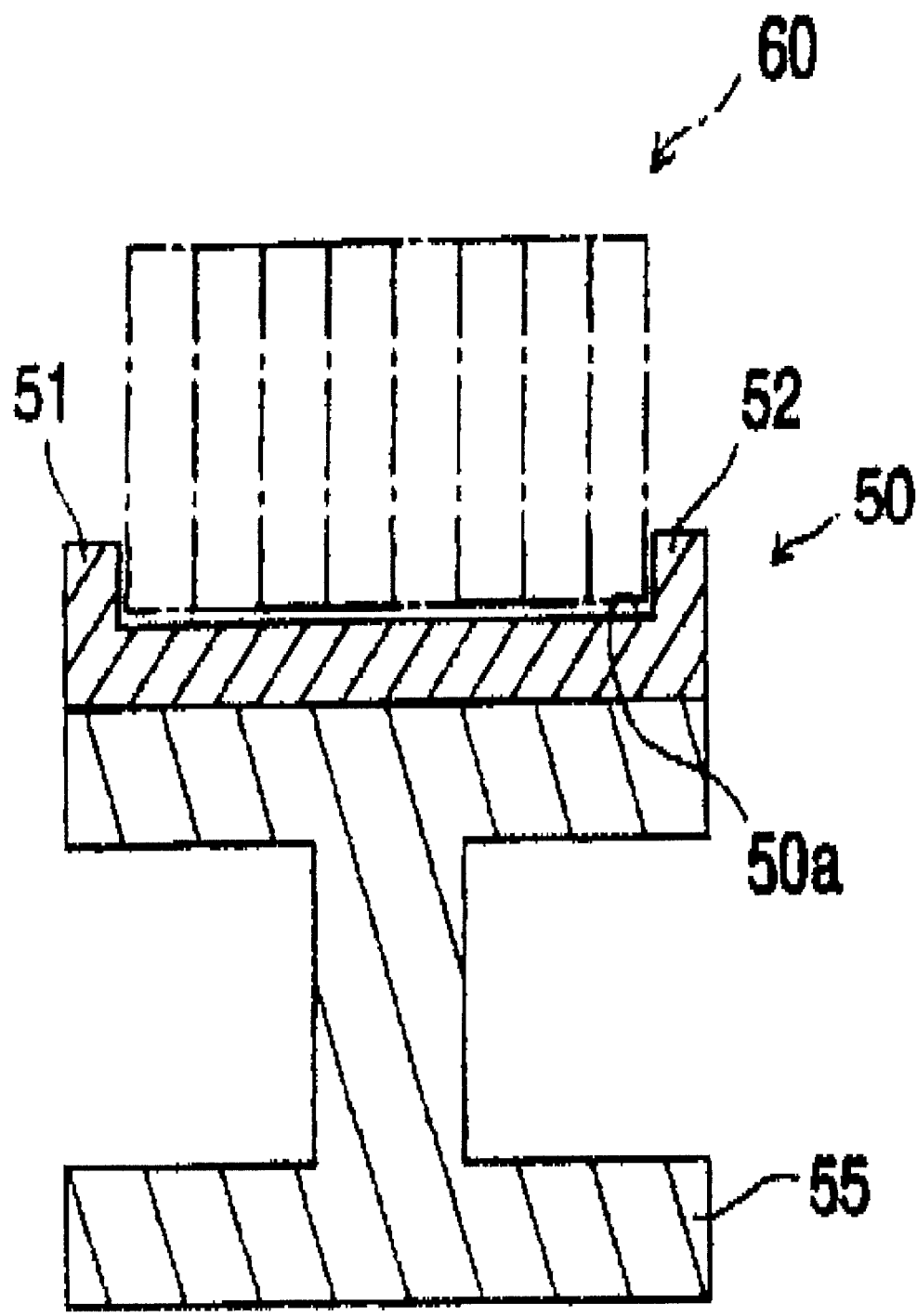
FIG. 8 shows a cross-sectional view of a prior art hydraulic tensioner arm assembly.
Figure 12:
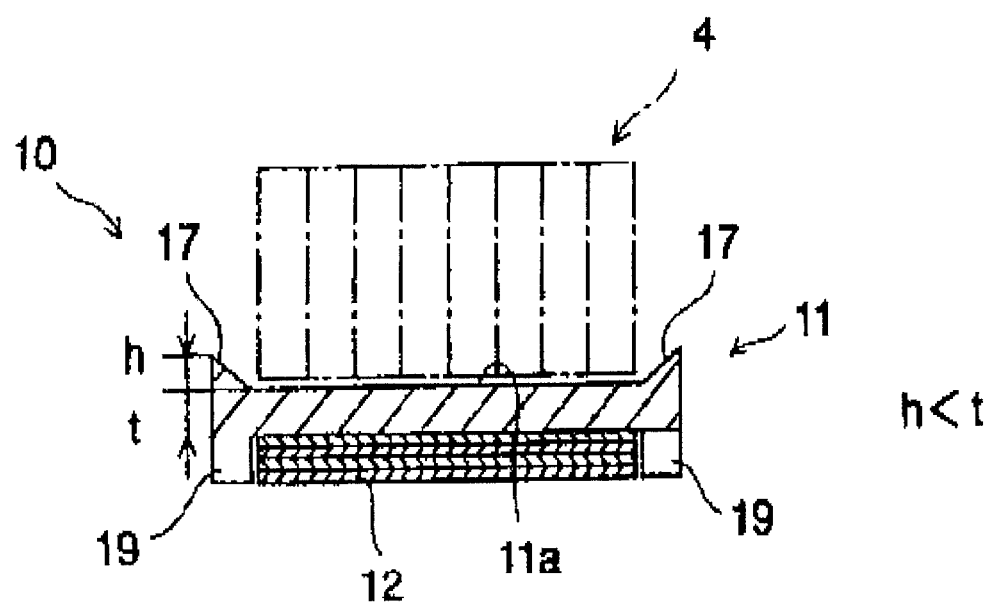
FIG. 12 shows a cross-sectional view along line IV—IV in FIG. 11.
Figure 13:
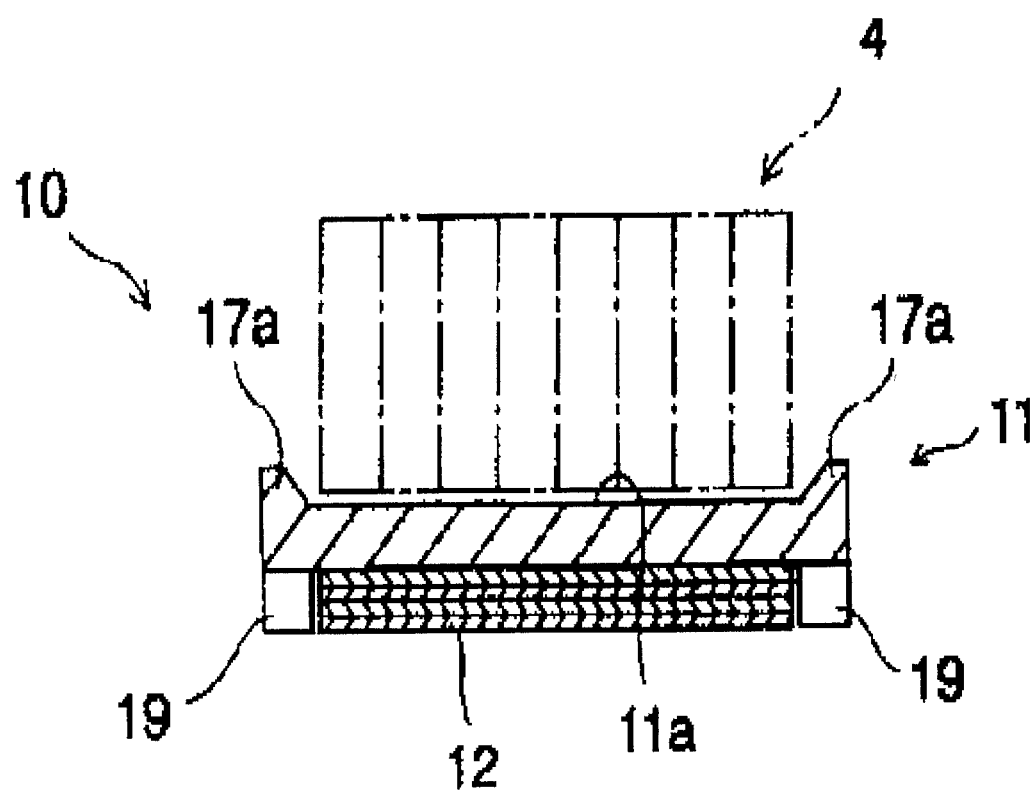
FIG. 13 shows an example of a change of shape of FIG. 12.

As shown in FIG. 12, letting the heights of the guide portions (17) be h and letting the plate thickness of the chain sliding face (11a) of the blade shoe (11) be t, the following relationships holds: h<t. In this case, by controlling the heights of the guide portions (17), it is possible to inhibit an increase in the flexural rigidity of the blade shoe (1), and as a result maintain the flexibility of the blade shoe (11) over the entire length of the blade shoe (11). The guide portions (20) have an approximately triangular cross-sectional shape in FIG. 12, but can also have a roughly trapezoidal cross-sectional shape, as shown in FIG. 13, by flattening the tops of the guide portions (17), so that they are almost parallel to the chain sliding face (11a). This enables a greater reduction in the blade shoe's sectional secondary moment and consequently its flexural rigidity, than in the case of a rectangular cross-sectional shape of the same height as in the prior art (FIG. 8). Therefore, it is possible to maintain the flexibility of the blade shoe over the entire length of the blade shoe, and the blade shoe's radius of curvature can be changed according to the slackness of the chain, thereby allowing it to constantly apply the appropriate tension to the chain. Also present in the examples shown in FIGS. 12 and 13 are the guide faces rising from the chain sliding face (11a), which form obtuse angles relative to the chain sliding face (11a). These guide faces are almost perpendicular to the chain sliding face (11a).

Figure 14:
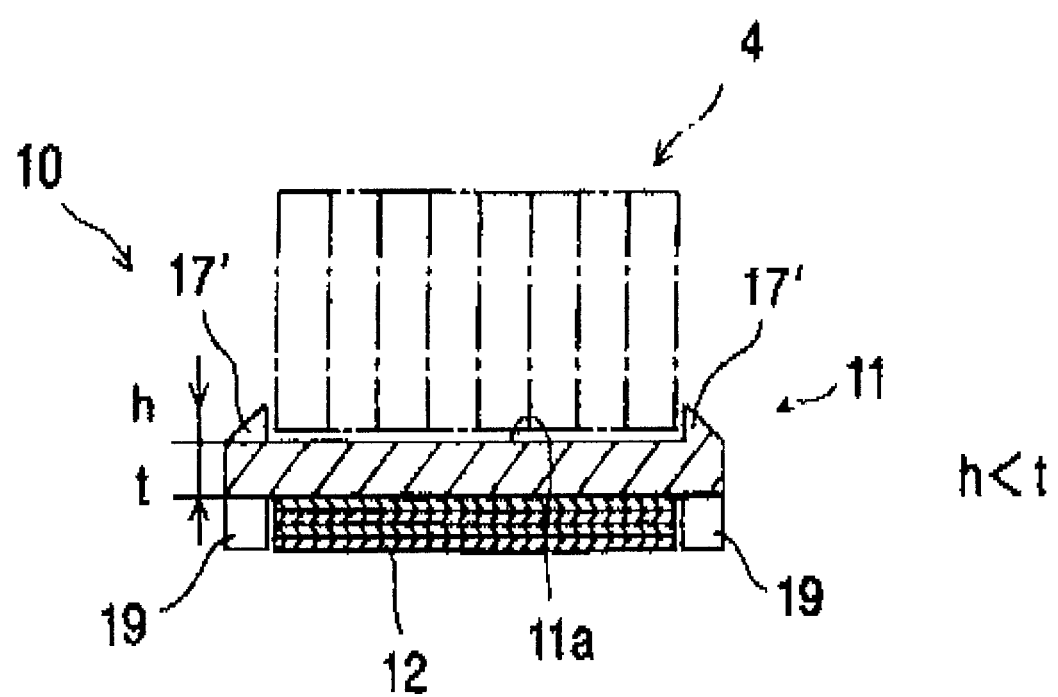
FIG. 14 shows a second example of a change in shape of FIG. 12.
Figure 15:
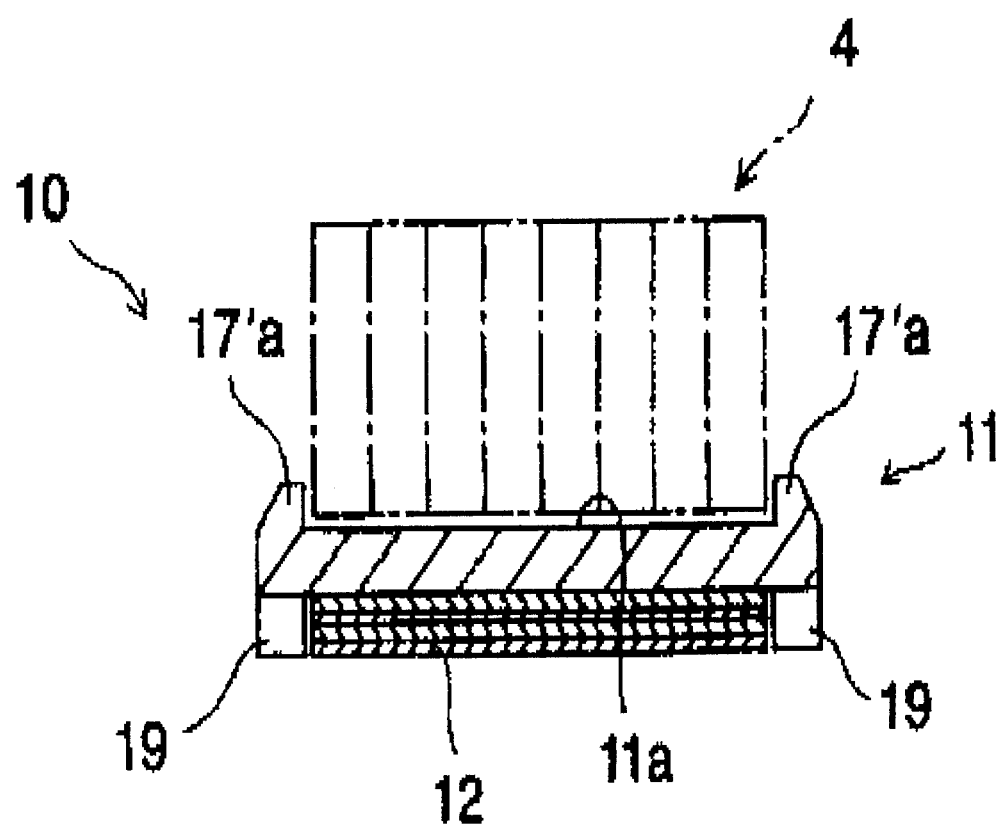
FIG. 15 shows a third example of a change in shape of FIG. 12.

FIG. 14 shows guide portions (17') having roughly triangular cross-sectional shapes similar to those seen in FIG. 12. FIG. 15 shows guide portions (17'a) having roughly trapezoidal cross-sectional shapes similar to those in FIG. 13. In these cases, each guide face of the guide portions (17')(17'a) rise almost vertically from the chains sliding surface (11a), thereby enabling the entire guide face to act as a surface that controls the transverse deflection of the chain. As a result, it is possible to reliably prevent the transverse deflection of the chain.

Figure 16:
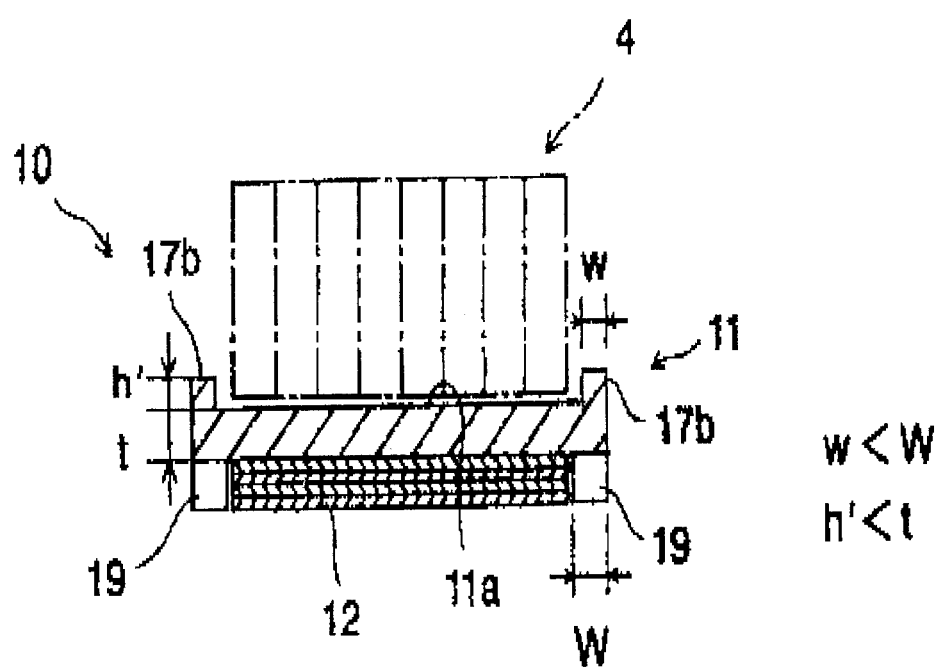
FIG. 16 shows a fourth example of a change in shape of FIG. 12.

FIG. 16 shows that it is possible to adopt thin guide portions (17b) having roughly rectangular cross-sectional shapes. In this case, letting the heights of the guide portions (17b) be h' and letting the transverse thickness of the guide portions (17b) and the support tabs (19) be w and W, respectively, the following relationships hold: h'<t and w<W. In this case, by limiting the transverse thickness of the guide portions (17b), it is possible to inhibit an increase in the flexural rigidity of the blade shoe (11) and maintain flexibility over the entire length of the shoe (11).

Figure 17:
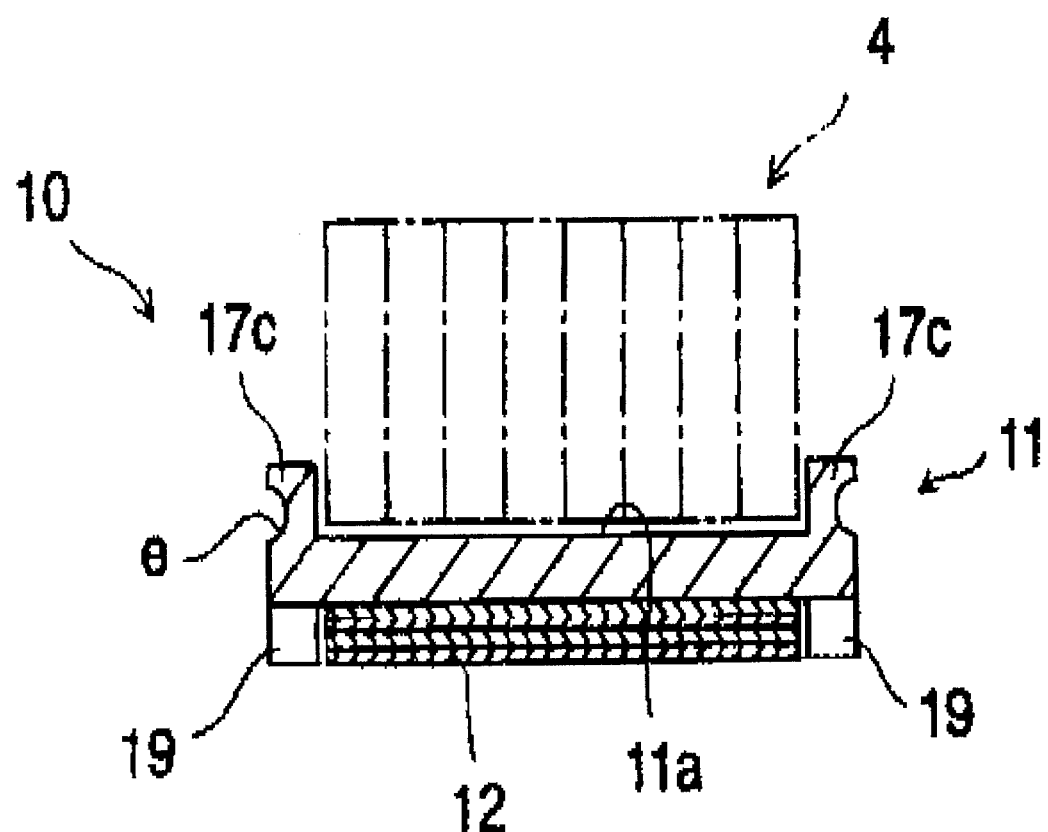
FIG. 17 shows a fifth example of a change in shape of FIG. 12.

FIG. 17 shows guide portions (17c), in which a concave portion e is formed in part of the outer face having a roughly rectangular cross-sectional shape. In this case, by forming the concave portion e, the blade shoe's flexural rigidity can be reduced below that if a rectangular cross-sectional shape of the same height and thickness. This also allows the flexibility of the blade shoe (11) to be maintained over the entire length of the blade shoe (11). In blade tensioners equipped with a blade shoe (11) having the aforethe cross-sectional shapes, during chain operation, the chain (4) travels while sliding along the chain face (11a) of the blade shoe (11). At this time, the guide portions at both sides of the blade shoe (11) transversely guide the chain (4) along the chain sliding face (11a). Plus, the resilience resulting from the elastic deformation of the blade shoe (11) and the blade springs (12) acts on the chain (4) as a compression load, thereby applying a uniform tension to the chain (4). In this case, each of the cross-sectional shapes of the guide portions (17)(17a)(17')(17'a)(17'b) that guide the chain (4) has a shape that inhibits an increase in the flexural rigidity of the blade shoe (11), thereby maintaining flexibility over the entire length of the blade shoe (11). As a result, the tension appropriate to the slackness of the chain (4) is applied to the chain (4).

Figure 18A:
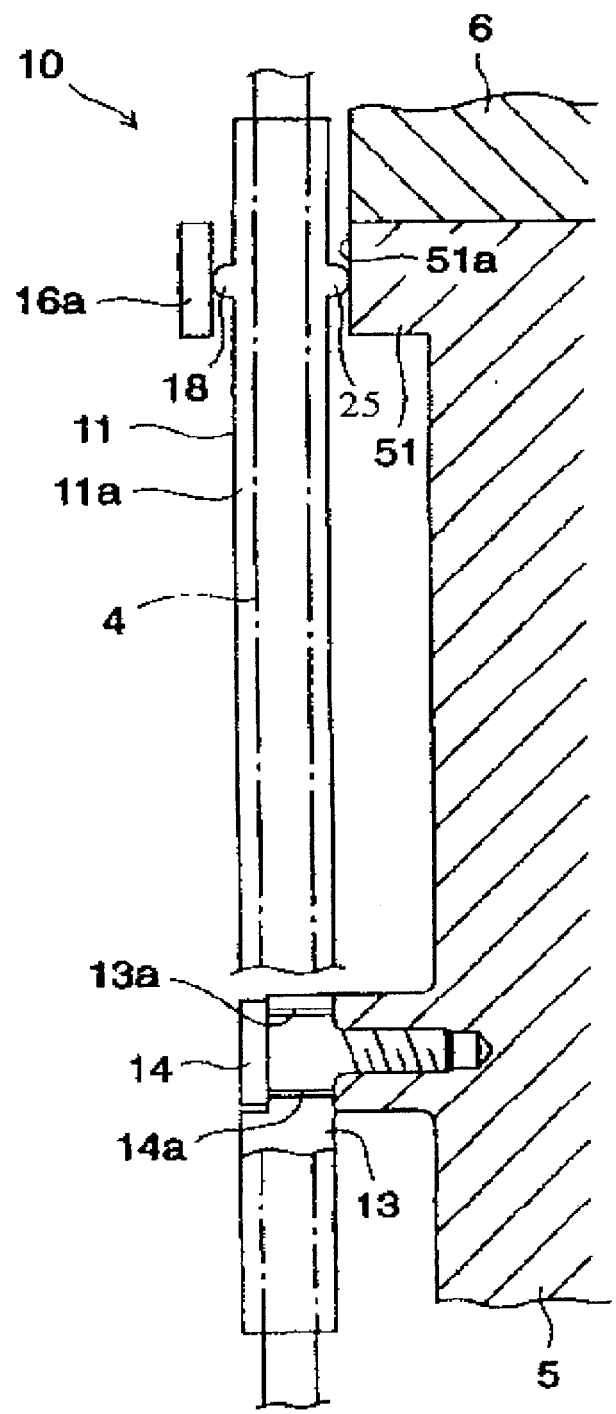
FIG. 18 shows a side view of the chain sliding face of the blade tensioner of the present invention (FIG. 18a) and an overall oblique view of the blade shoe that forms the blade tensioner of the present invention (FIG. 18b).
Figure 18B:
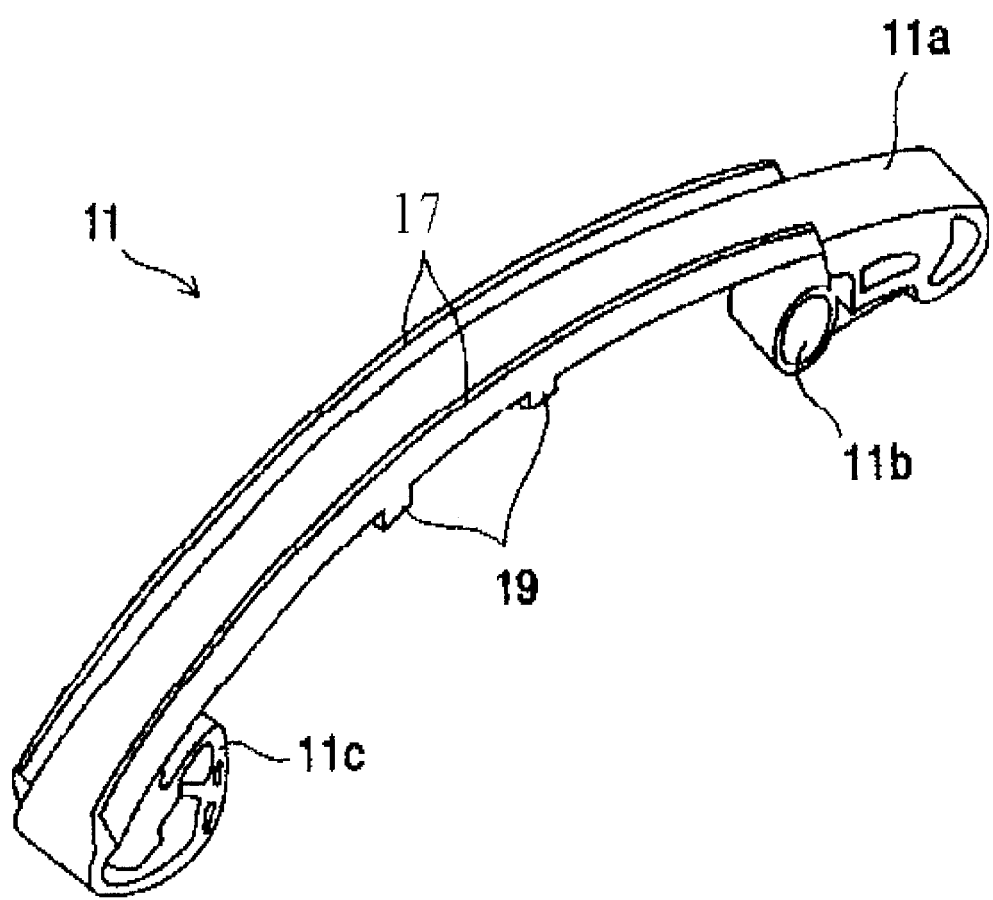

FIG. 18a shows a pair of hemispherical projecting parts (25)(18), formed on both sides of the distal end portion (15) of the blade shoes (11). On one side of the blade shoe (11), a stop part (51) projects toward the blade tensioner (10) from the engine's cylinder block (5). A flat support face (51a) is formed in the stop part (51), while leaving a predetermined gap between it and the blade shoe (11). One the cylinder block (5) side, a projecting part (25) of the distal end portion (15) of the blade shoe (11) is able to contact the support face (51a) of the cylinder block (5). Also provided on the support face (16), in the engine, is the control member (16a), which is disposed on the side of the distal end portion (15) of the blade shoe (11) and is used to control deflection to the side opposite the cylinder block (5) of the distal end portion (15) of the blade shoe (11). The control member (16a) is formed integrally with the support face (16). The projecting part (18) of the blade shoe's distal end portion (15) is able to contact the control member (16a).

During chain operation, the chain (4) travels while sliding along the chain sliding face (11a) of the blade shoe (11). At this time, resilience (i.e. spring force) resulting from the elastic deformation of the blade shoe (11) and the blade springs (12) is applied to the chain (4) as compression loading, thereby applying a constant tension to the chain (4). When the blade tensioner (10) attempts to tilt sideways, toward the cylinder block (5) during operation, the projecting part (25) of the blade shoe (11) contacts the support face (51a) formed on the atop part (51) of the cylinder block (5), thereby preventing the sideways tilting of the blade shoe (11). In this case, even when the projecting part (25) of the blade shoe (11) is in constant contact with the stop part (51) of the cylinder block (5), engine oil that drips along the cylinder wall lubricates these contact surfaces, thereby preventing wear of the contact surface between the projecting part (25) and the stop part (51). Also, when the blade tensioner (10 attempts to tilt sideways toward the side opposite the cylinder block (5) the projecting part (18) of the blade shoe (11) contacts the control member (16a) provided on the support face (16) thereby preventing the blade shoe (11) from tilting sideways.

Figure 19:
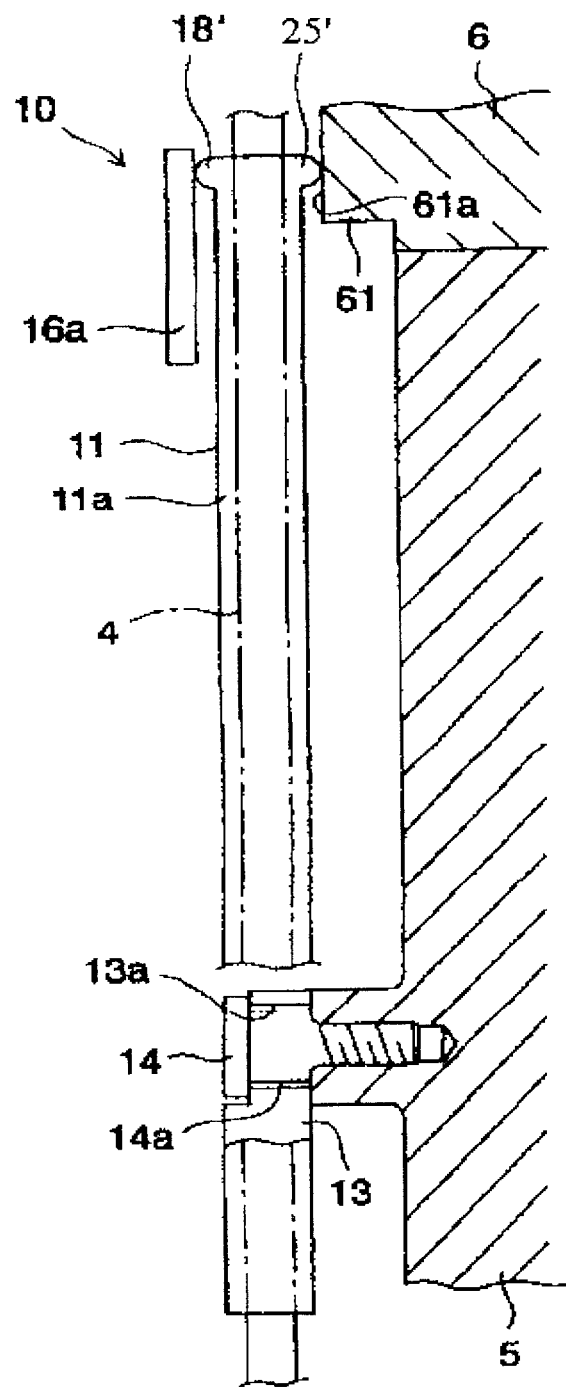

Furthermore, the projecting parts (25)(18) of the blade shoe (11) may be provided farther toward the distal end than the position shown in FIG. 18a. The first example of a change to FIG. 18a, is shown in FIG. 19. In this case, the projecting parts (25')(18') are provided at the tip of the blade shoe (11). On the other hand the stop part (61) that projects toward the blade tensioner (10) sides is provided on the cylinder head (6) as an engine-side structural component that is contactable by a projecting part (25'). Flat support face (61a) is formed on the stop part (61) while leaving a predetermined gap between it and the blade shoe (11). Also, the projecting part (18') contacts the control member (16a).

Figure 20:
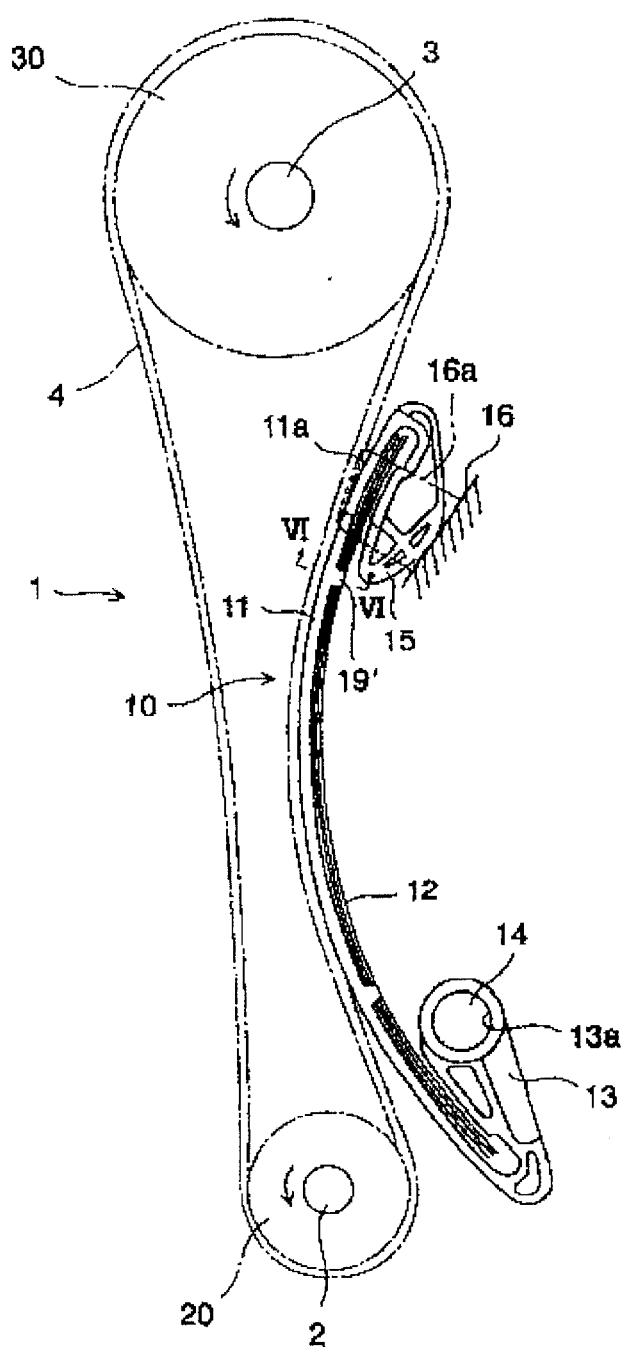
FIG. 20 shows a schematic cross-sectional view of the rear side of the engine camshaft timing system of FIG. 9.
Figure 21:
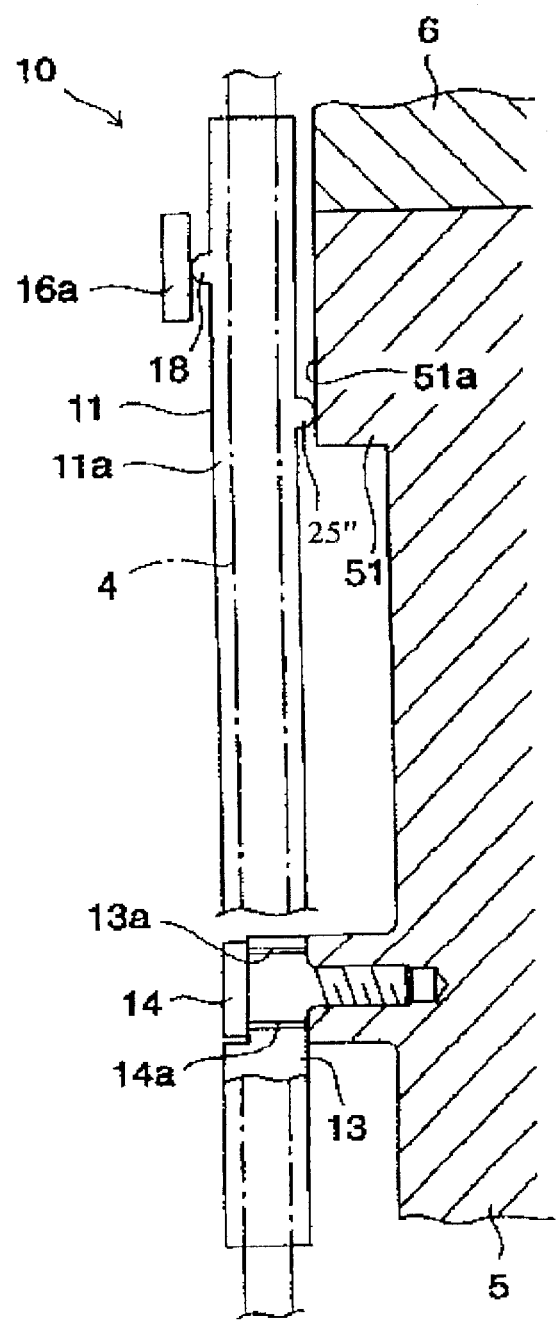
Figure 22:
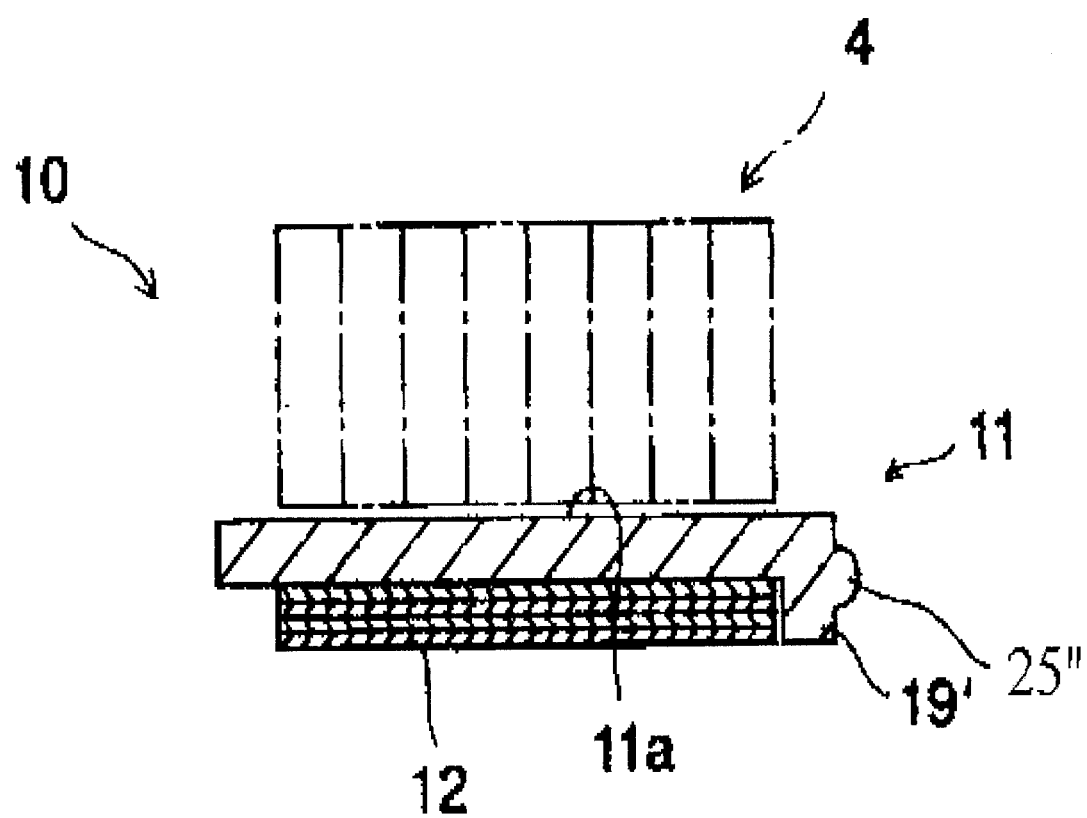
FIG. 22 shows a cross-sectional view along line VI—VI in FIG. 20.

FIGS. 20 through 22 explain the second example of a change to FIG. 18a. As shown in FIG. 20, the support piece (19'), which is sued to transversely support the blade springs (12) is provided in the vicinity of the distal end portion of the rear side of the blade shoe (11).

As shown in FIGS. 21 and 22, the projecting part (25") is provided on the outer face of the support piece (19'). The projecting part (25") contacts the support face (51a) of the cylinder block (5). In this case, not only does the projecting part (17") prevent the blade tensioner (10) from tilting toward the cylinder block, but also it can reinforce the support piece (19'), on which the forces of the blade springs (12) are exerted during operation.

Figure 23:
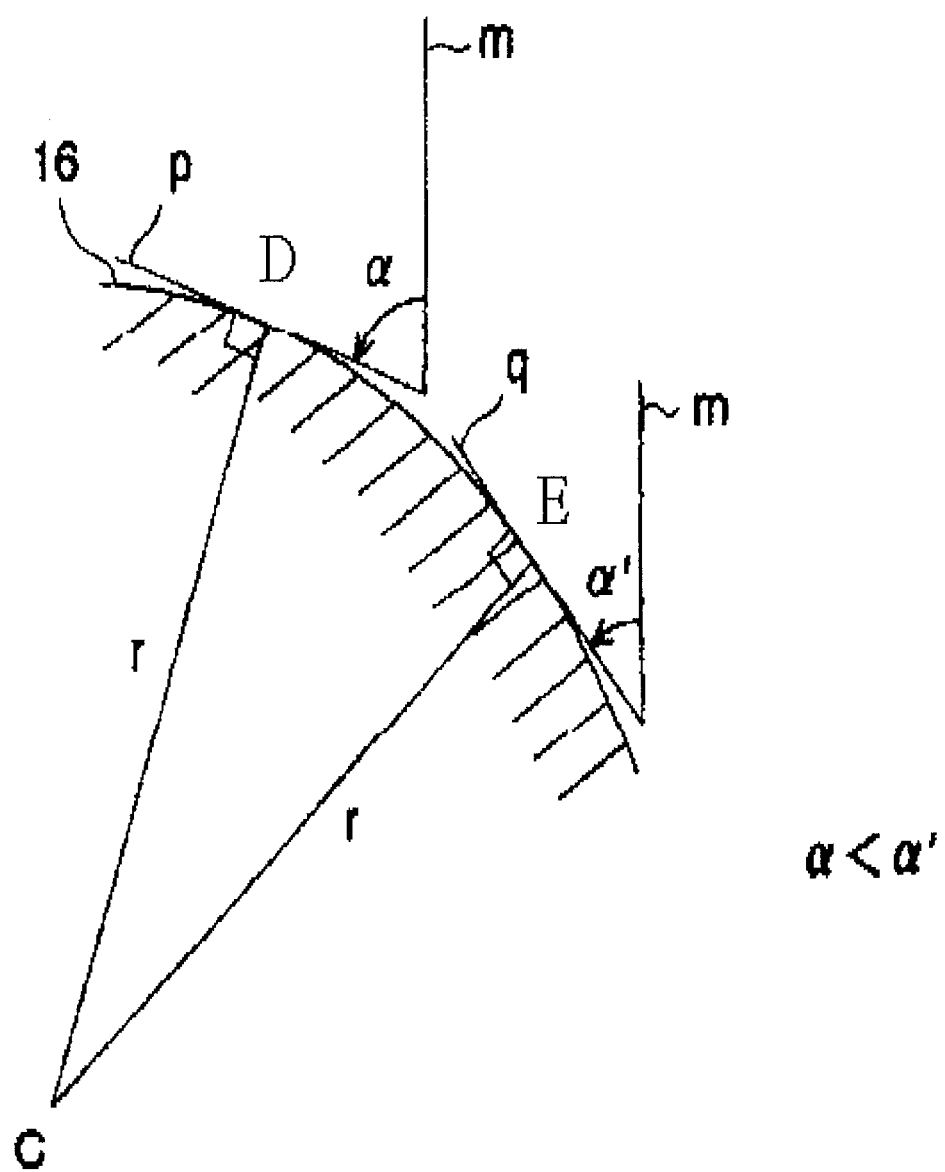
FIG. 23 shows an enlarged view of the support face that exemplifies the difference in slopes of the first and second tangential lines.

FIG. 23 shows an enlarged view of the support face. Point D on the support face (16) indicates the point of contact with the blade shoe (11) before the timing chain elongates (i.e. the first contact point) and point E indicates the point of contact with the blade shoe (11) after the timing chain elongates (i.e. the second contact point). Points D and E are connected by means of the arc with radius r and with its center at point C. The line tangential to the support face (16) at the first contact point D (i.e. the first tangent line) is p, and the line tangential to the support face (16) at the second contact point E (i.e. the second tangent line) is q. Letting the angles formed counterclockwise by the tangent lines p and q, relative to the vertical lines m connecting the crankshaft (2) and the camshaft (3) by α>α', respectively. In contrast, in a conventional linear support face α=α'.

Figure 24:
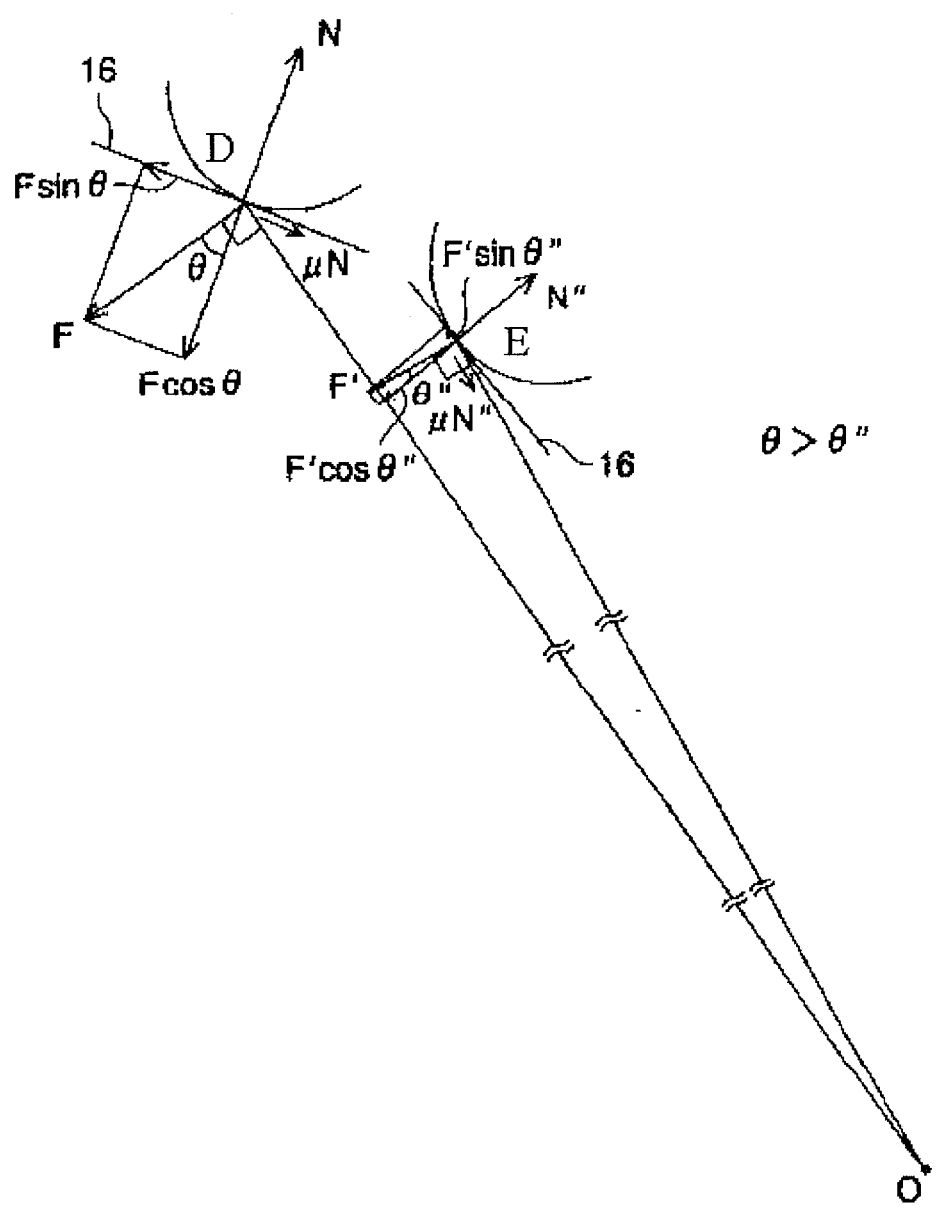
FIG. 24 explains the equilibrium forces at each contact point, when the compression force of the chain acts upon the first and second contact points.

As show in FIG. 24, the compression forces F, F' are decomposed at points D, E in the direction parallel to the support face (16) and in the direction orthogonal to the support face (16). The angles formed by the directions in which the compression forces F, F' are exerted and the directions orthogonal to the support face are labeled θ, θ" respectively.

Of the compression forces F at point A, F cos θ, the component orthogonal to the support face, is in equilibrium with the normal force N of the support face (16). Also, the frictional force $\mu N$, $\mu$: being the coefficient of friction, is exerted in the direction opposite to the direction in which F sin θ, the component parallel to the support face, is exerted.

Of the compression forces F' at point B, F' cos θ", the component orthogonal to the support face, is in equilibrium with the normal force N" of the support face (16). Also, the frictional force $\mu N''$ is exerted in the direction opposite to the direction in which F' sin θ", the component parallel to the support face, is exerted.

In this case, also, $$F' < F$$

so

In this case, however $$\theta'' < \theta < \theta'$$

Therefore, $$\cos \theta' < \cos \theta''$$

Consequently, $$\mu F' \cos \theta' < \mu F' \cos \theta''$$

Lastly, $$\mu N' < \mu N''$$

Figure 1:
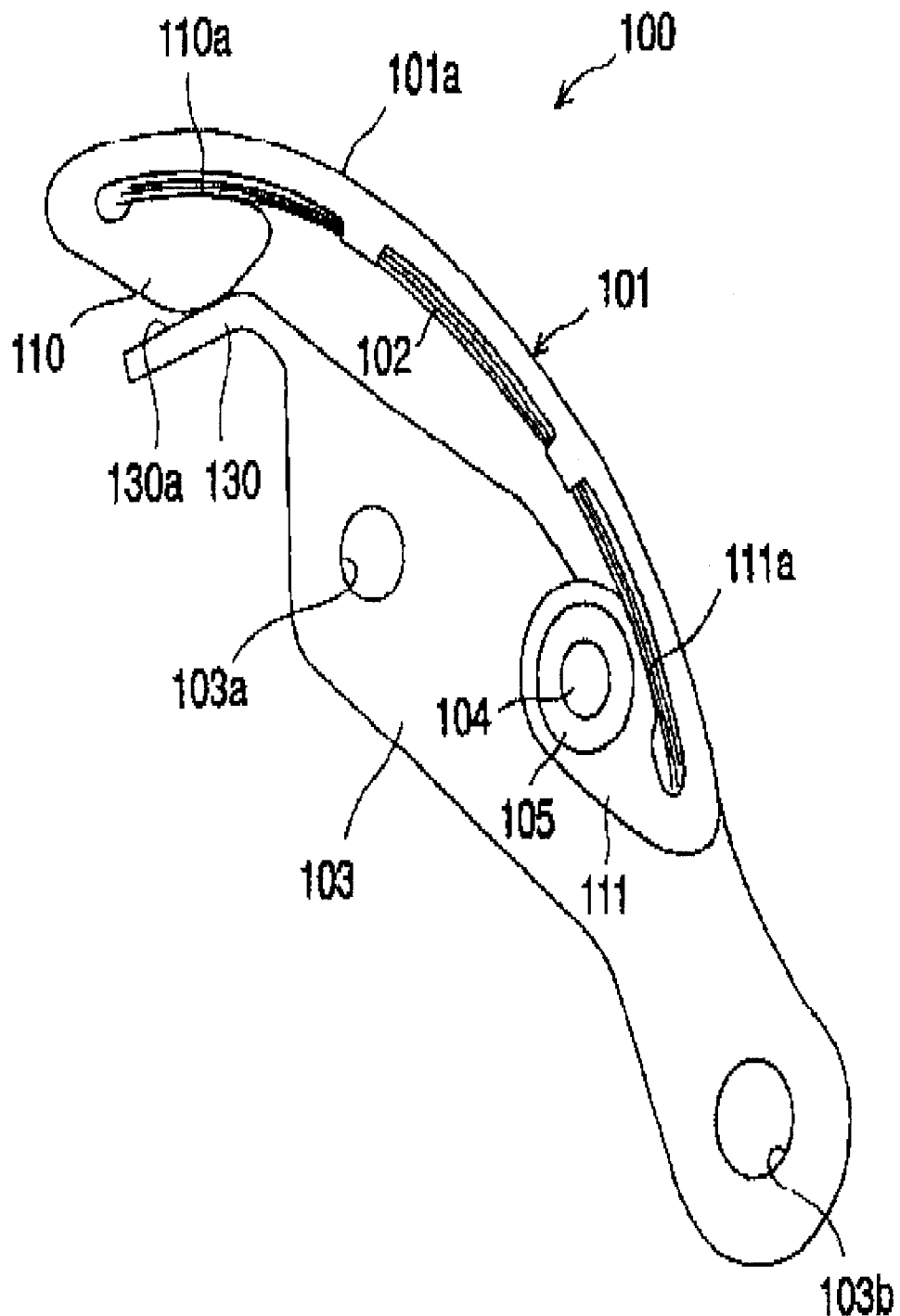
FIG. 1 shows a side view of a prior art blade tensioner that is applied to an engine's auxiliary drive chain.
Figure 2:
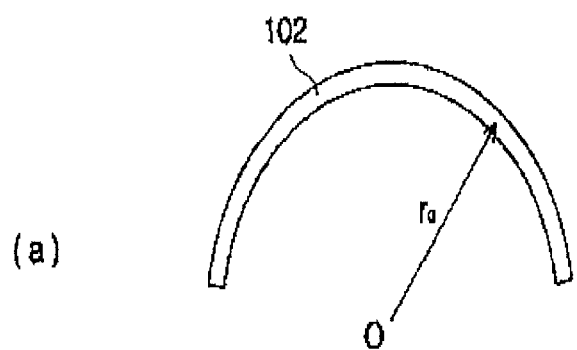
FIG. 2 shows an enlarged view of a prior art blade spring used in the blade tensioner of FIG. 1, before mounting in the blade shoe (FIG. 2a) and after mounting in the blade shoe and the engine (FIG. 2b).
Figure 2:
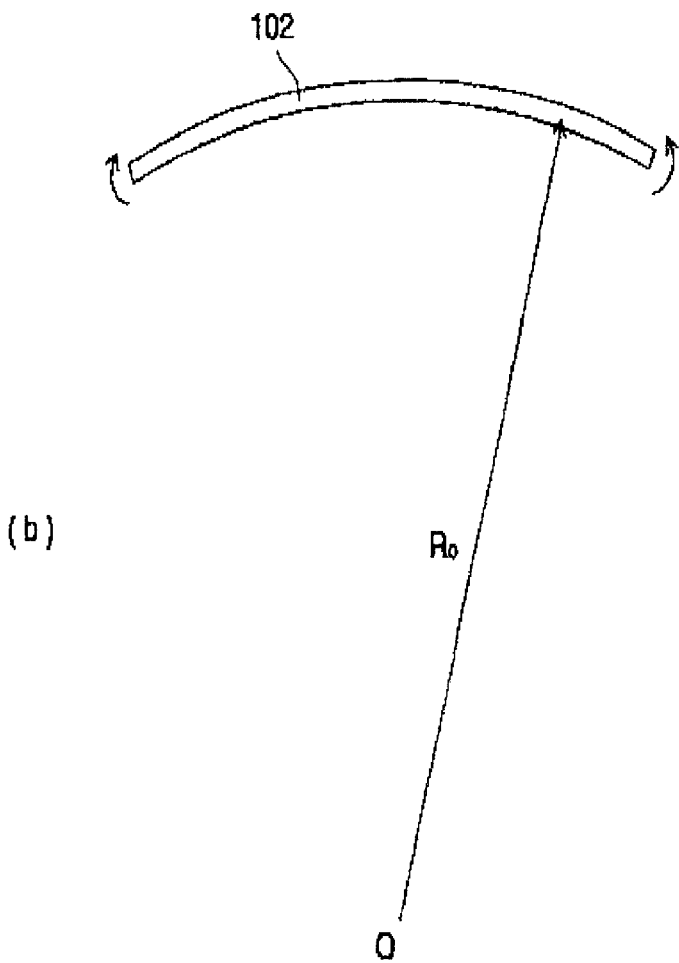
Figure 3:
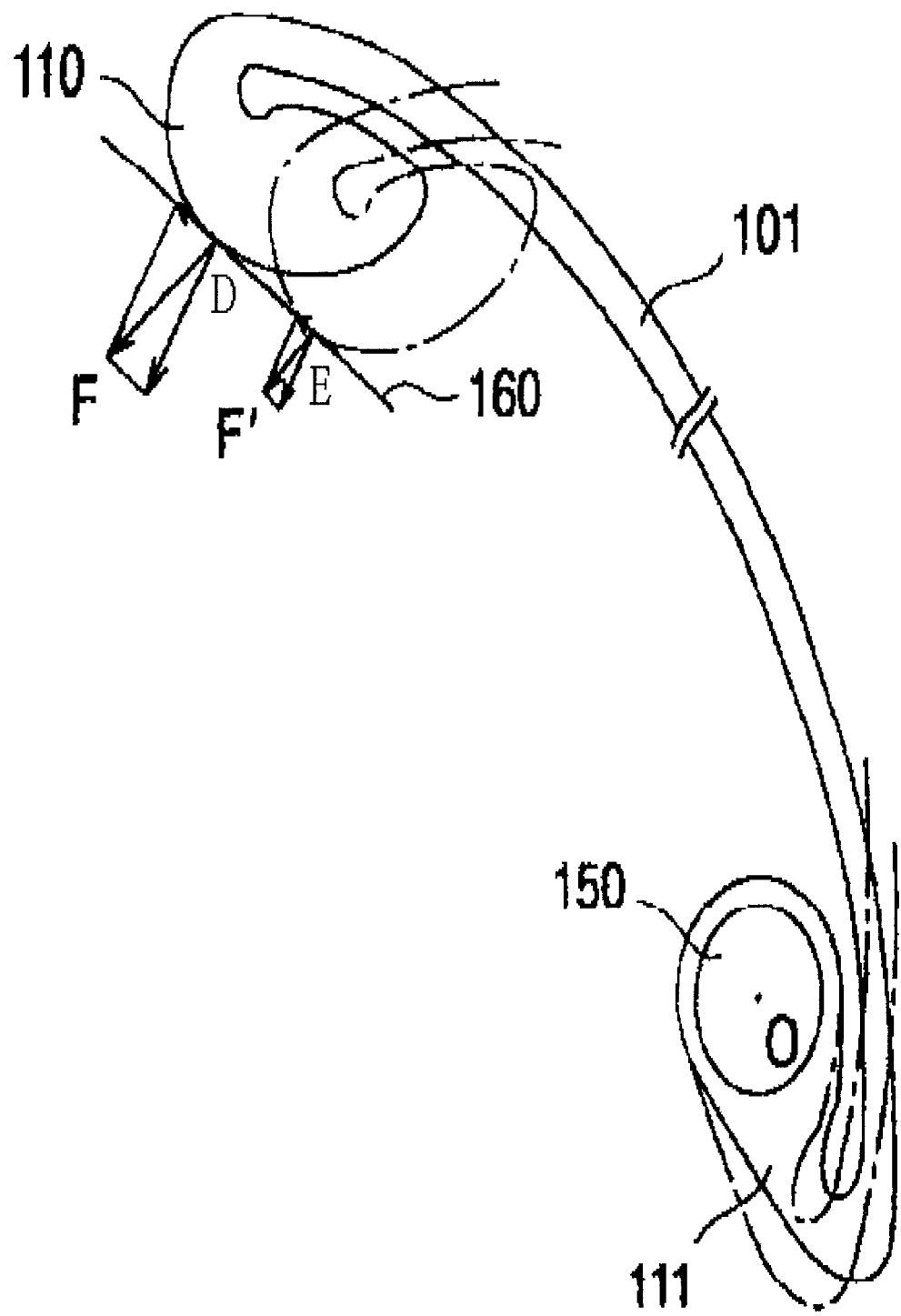
FIG. 3 shows a schematic cross-sectional view of a prior art blade tensioner system after the blade tensioner is applied to the engine's timing chain.
Figure 4:
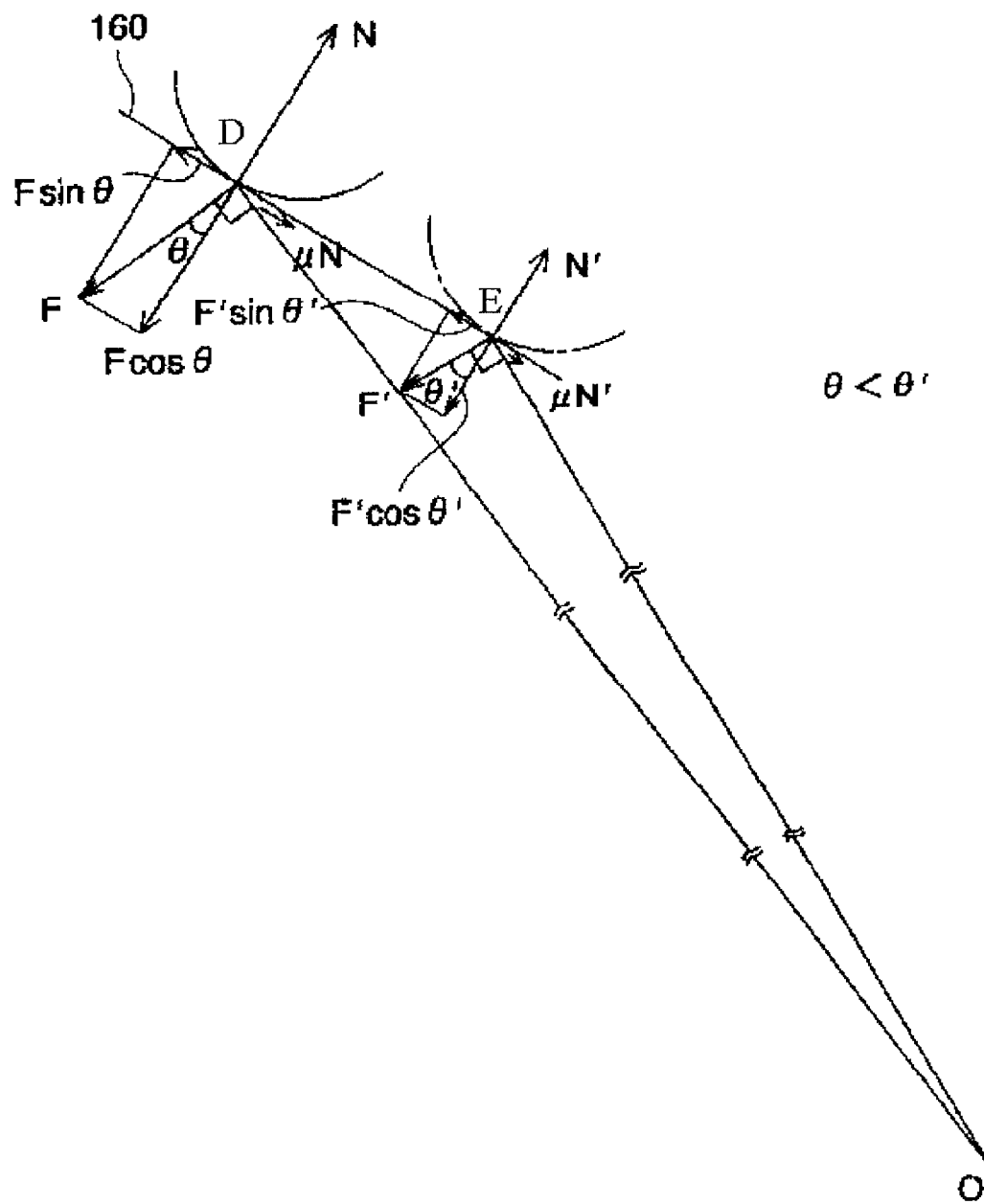
FIG. 4 explains the equilibrium of forces at each point on the support face and is prior art.
Figure 5:
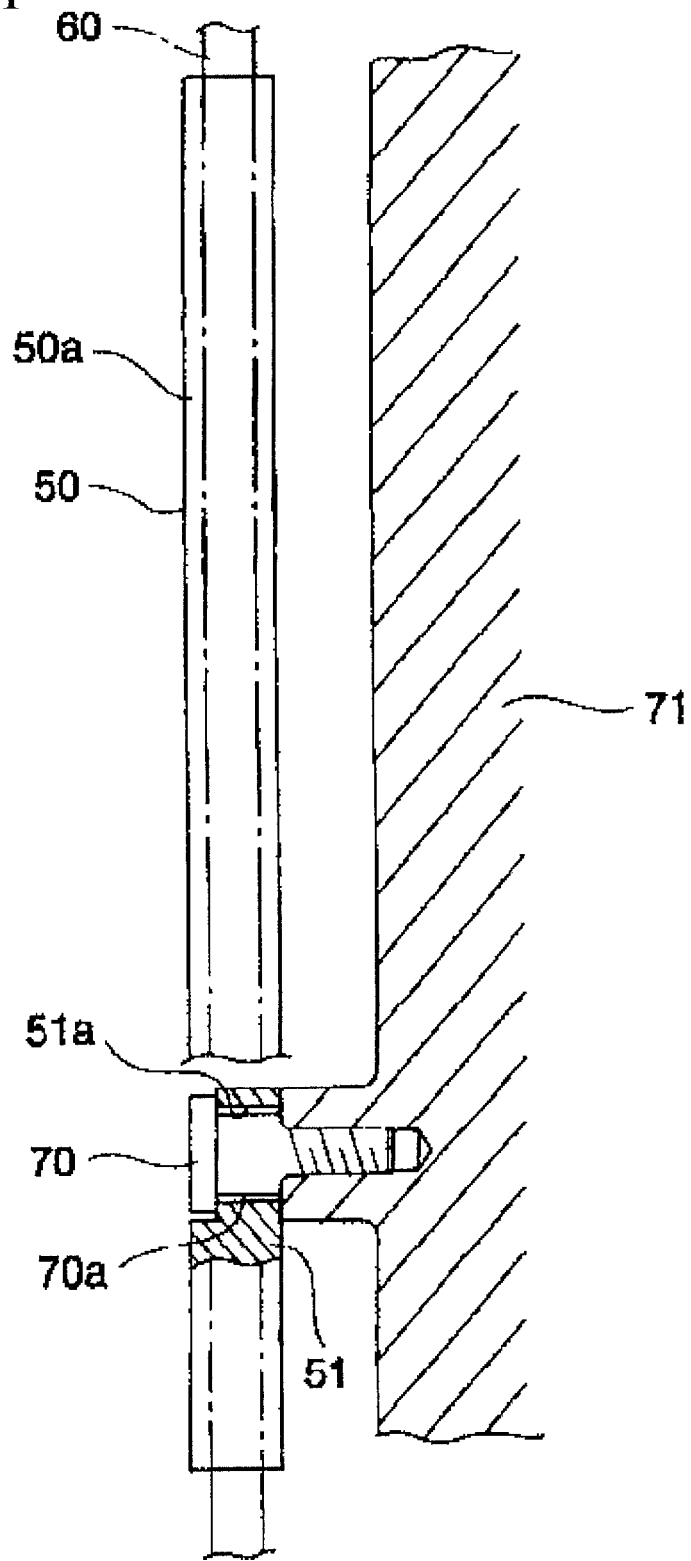
FIG. 5 shows a side view after applying the prior art blade tensioner to the timing chain.
Figure 6:
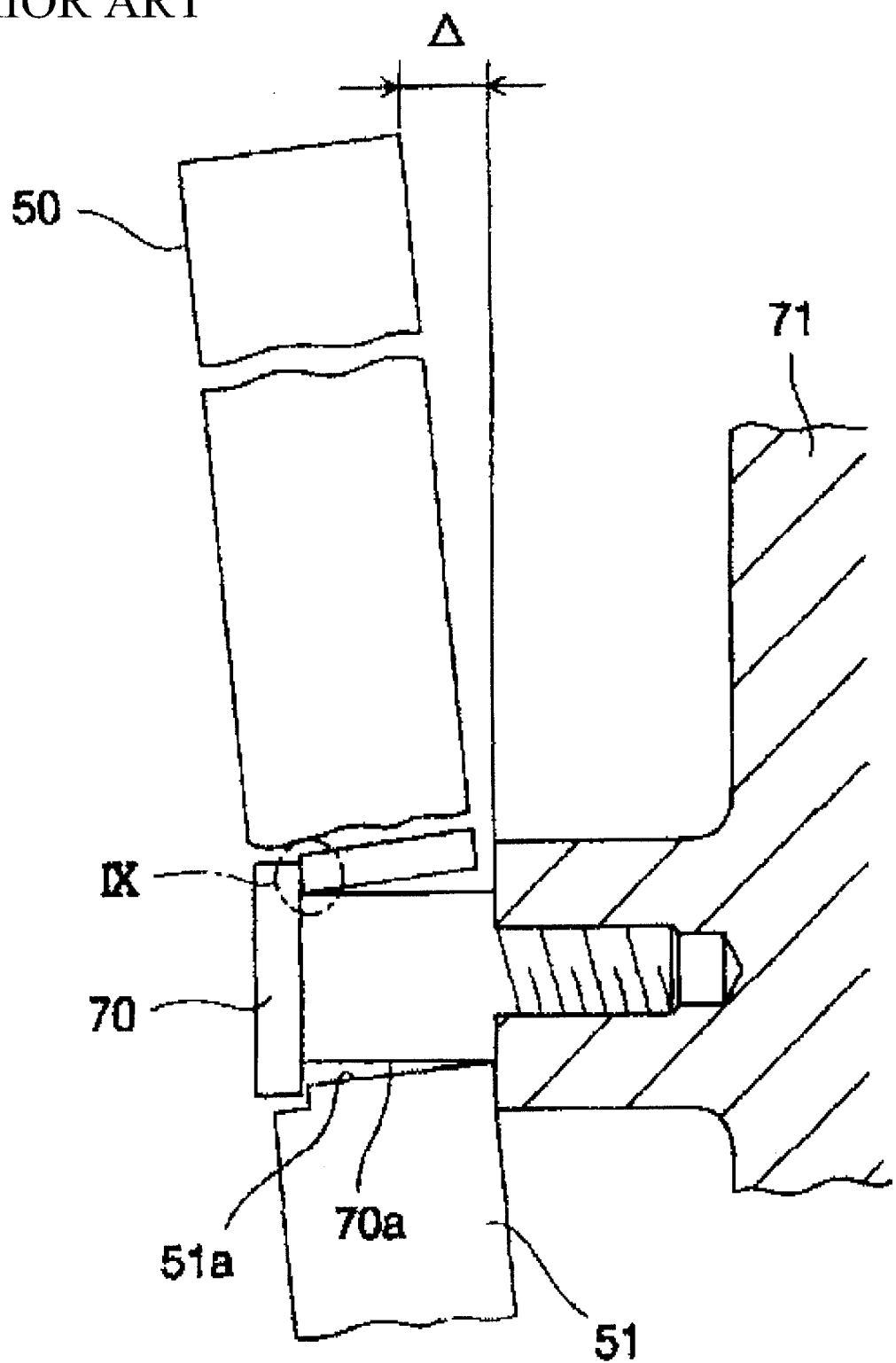
FIG. 6 explains a problem associated with prior art FIG. 5.
Figure 7:
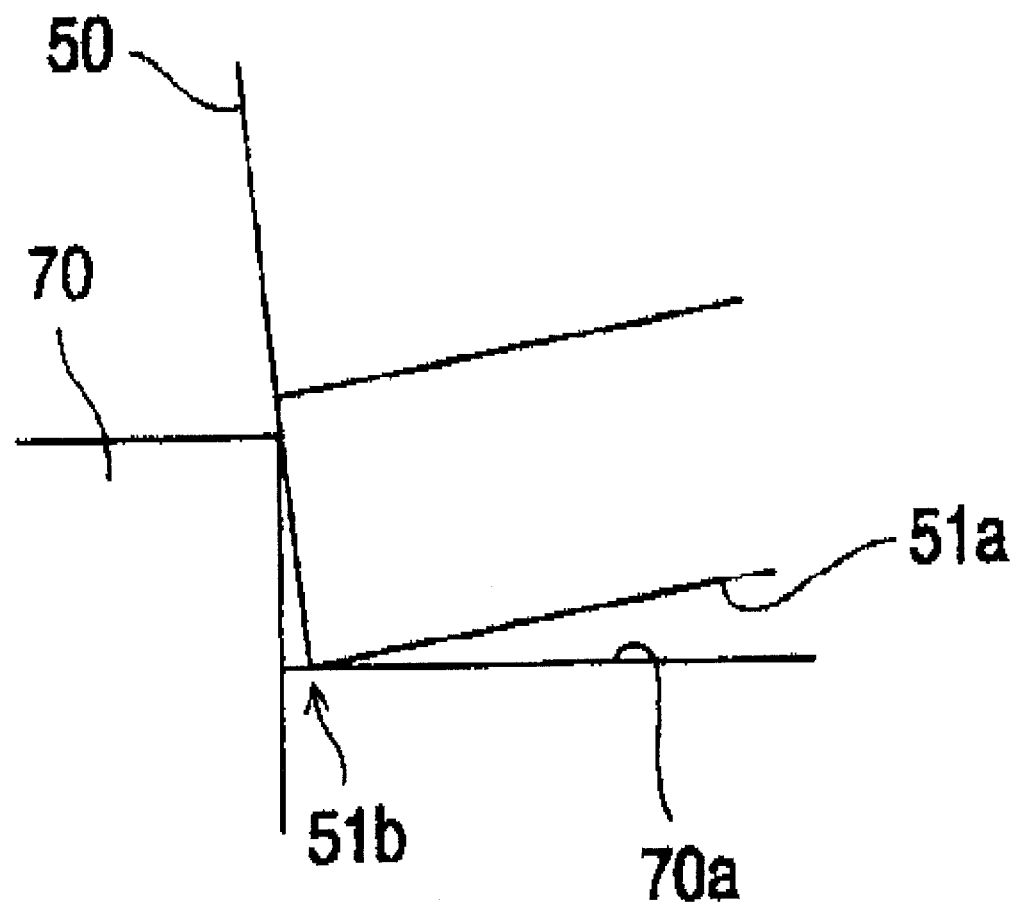
FIG. 7 shows a partially enlarged view of area IX in prior art FIG. 6.

In this case, therefore, the frictional force at point E is greater than in prior art FIG. 4. At second contact point E, this improves the blade tensioner's damping of the chain.

Furthermore, although the example of a single overhead camshaft-type (SOHC-type) engine is cited in the aforementioned embodiments, the blade tensioner system of the present invention applies similarly to a double overhead camshaft-type (DOHC-type) engine. Also, the application of the blade tensioner system of the present invention is not limited to an engine camshaft timing system. The relevant system also is applicable to a auxiliary drive chain that drives an auxiliary machine (e.g., an oil pump) within an engine.

Moreover, the blade tensioner of the present invention is not limited to configurations such as those shown in FIGS. 9 and 10. It also is applicable to a blade tensioner of any other shape and configuration, as long as it is a blade tensioner such that the blade springs are disposed on the side opposite the chain sliding face of the blade shoe.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A blade tensioner for a chain that drivingly connects a driving shaft in an engine to a driven shaft of the engine, the blade tensioner comprising:
   a) a blade shoe having an arcuately curved chain sliding face;
   b) a proximal end portion provided at a proximal side of the shoe, arranged to rotate freely around a support shaft mounted on the engine and inserted therethrough;
   c) a distal end portion provided at a distal end of the shoe, for sliding freely along a support face provided in the engine;
   d) a plurality of blade springs disposed opposite the chain sliding face of the blade shoe, for exerting a spring force on the blade shoe;

the chain sliding face having a longitudinal dimension parallel to the chain, and a width between sides greater than a width of the chain, a guide portion extending continuously along each of the sides of the chain sliding face for guiding the chain sliding along the chain sliding face between the guide portions, the guide portions having a height, a plate thickness, and a cross-sectional shape selected such that a flexural rigidity of the blade shoe is not increased;

wherein the guide portions (17) are provided in a region that includes a contact start location (A) and a separation start location (B);

wherein the contact start location and the separation start location of the guide portions, have heights ($h_A$) and ($h_B$) respectively, and the height in an intermediate section between the contact start location and the separation start location of the guide potions is ($h_C$), resulting in relationships $h_C \geq h_A$ and $h_C \geq h_B$.

2. The blade tensioner of claim 1, wherein the height of the guide portions is (h) and the plate thickness of the shoe (t), wherein the height and the plate thickness have a relationship h<t.

3. The blade tensioner of claim 1, wherein the contact start location is located where the chain starts to contact the chain sliding face of the shoe when the blade tensioner and chain are installed in an engine.

4. The blade tensioner of claim 1, wherein the separation start location is located where the chain starts to separate from the chain sliding face of the shoe when the blade tensioner and chain are installed in an engine.

5. The blade tensioner of claim 1, wherein the cross-sectional shape of each of the guide portions is approximately triangular or roughly trapezoidal, a sloping face of the guide portion facing the chain and forming a guide face at an obtuse angle relative to the chain sliding face.

6. The blade tensioner of claim 1, wherein the cross-sectional shape of each of the guide portions are approximately triangular or roughly trapezoidal, a sloping face of the guide portion facing outwardly away from the chain and an opposite side of the guide portion forms a guide face orthogonal to the chain sliding surface.

7. The blade tensioner of claim 1, wherein the cross-sectional shape of the guide portions is roughly rectangular and has a concave portion formed on outer sides of the guide faces rising from the chain sliding face.

8. The blade tensioner of claim 1, wherein a control member is disposed to be coupled to the blade tensioner that controls lateral movement of the distal end portion of the blade shoe and is provided on the support face in the engine.

9. The blade tensioner of claim 8, wherein the control member is formed integrally with the support face.

10. The blade tensioner of claim 1, wherein the distal end portion of the blade shoe contacts the support face at a first contact point prior to elongation of the chain and the distal end portion of the blade shoe contacts the support face at a second contact point after elongation of the chain during operation.

11. The blade tensioner of claim 10, wherein the first and second contact points on the support face are connected by a convex arcuate face.

12. The blade tensioner of claim 10, wherein the support face is shaped such that the angle a formed between a tangent line at the first contact point and a line between the driven shaft and the driving shaft, and the angle a' formed between a tangent line at the second point of contact and the line between the driven shaft and the driving shaft have the relationship a>a'.

13. The blade tensioner of claim 1, further comprising a projecting part provided on a side face of the distal end portion, the projecting part contacting the support face when the tensioner is installed on the engine.

14. The blade tensioner of claim 13, wherein the projecting part is spherical in shape.

15. The blade tensioner of claim 1, further comprising a flat stop on the engine, with a predetermined gap between it and a side face of the distal end portion.

16. The blade tensioner of claim 1, wherein a support piece that transversely supports the blade springs is provided in the shoe and the support pieces form the vicinity of the distal end portion of the blade shoe.

17. The blade tensioner of claim 1, further comprising at least one support tab on the shoe opposite the guide portions on the chain sliding face, having a transverse direction thickness of W, the guide portion being roughly rectangular with a transverse thickness f w, the transverse direction thickness of the support tab and the transverse direction thickness of the guide portion having the relationship w<W.

* * * * *

UNITED STATES PATENT AND TRADEMARK OFFICE
CERTIFICATE OF CORRECTION

PATENT NO. : 6,808,467 B2  Page 1 of 1
APPLICATION NO. : 10/147710
DATED : October 26, 2004
INVENTOR(S) : Hiroyuki Takeda et al.

It is certified that error appears in the above-identified patent and that said Letters Patent is hereby corrected as shown below:

Title page, item (73) Assignee: should read as follows:
BorgWarner Automotive K.K., Nabari City, 518-0495 Japan and Honda Giken Kogyo Kabushiki Kaisha, Tokyo, 107-8556 Japan Title page, item (30) Foreign Application Priority Data should read as follows:
May 17, 2001  (JP)...............................2001-148440
May 17, 2001  (JP)...............................2001-147640
May 17, 2001  (JP)...............................2001-147538

Signed and Sealed this

Third Day of June, 2008

JON W. DUDAS
*Director of the United States Patent and Trademark Office*